(12) United States Patent
Nishikawa

(10) Patent No.: US 9,966,077 B2
(45) Date of Patent: May 8, 2018

(54) SPEECH RECOGNITION DEVICE AND METHOD

(71) Applicant: Panasonic Intellectual Property Corporation of America, Torrance, CA (US)

(72) Inventor: Tsuyoki Nishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 57 days.

(21) Appl. No.: 14/969,479

(22) Filed: Dec. 15, 2015

(65) Prior Publication Data

US 2016/0189715 A1    Jun. 30, 2016

(30) Foreign Application Priority Data

Dec. 26, 2014 (JP) ................. 2014-266033

(51) Int. Cl.
| | |
|---|---|
| G10L 15/20 | (2006.01) |
| G10L 15/32 | (2013.01) |
| G10L 15/30 | (2013.01) |
| G10L 21/0208 | (2013.01) |

(52) U.S. Cl.
CPC .............. *G10L 15/32* (2013.01); *G10L 15/30* (2013.01); *G10L 15/20* (2013.01); *G10L 21/0208* (2013.01)

(58) Field of Classification Search
CPC ...... G10L 21/0208; G10L 15/20; G10L 21/02
USPC .................................... 704/233, 231
See application file for complete search history.

(56) References Cited

U.S. PATENT DOCUMENTS

| | | | | |
|---|---|---|---|---|
| 5,917,944 A | * | 6/1999 | Wakisaka ............ | G06F 17/2755 382/190 |
| 2011/0071823 A1 | * | 3/2011 | Iwasawa ................. | G10L 15/28 704/231 |
| 2012/0330651 A1 | * | 12/2012 | Obuchi ................... | G10L 15/30 704/225 |
| 2013/0166286 A1 | * | 6/2013 | Matsumoto ............. | G10L 21/02 704/205 |
| 2016/0118042 A1 | * | 4/2016 | Talwar ................ | G10L 21/0208 704/233 |

FOREIGN PATENT DOCUMENTS

JP    2013-064777    4/2013

* cited by examiner

*Primary Examiner* — Jakieda Jackson
(74) *Attorney, Agent, or Firm* — Greenblum & Bernstein, P.L.C.

(57) ABSTRACT

A terminal is provided that includes a speech acquisition unit that acquires first speech information, and a first speech processor that removes noise contained in the first speech information using a first removal method and outputs the noise-removed speech information as second speech information. The terminal also includes a first speech recognition unit that performs speech recognition on the second speech information and outputs the speech recognition result as first speech recognition result information. The terminal further includes a communication unit that receives a speech recognition result as second speech recognition result information from a server, and a determination unit that makes a selection as to which of the first speech recognition result information and the second speech recognition result information should be outputted.

13 Claims, 16 Drawing Sheets

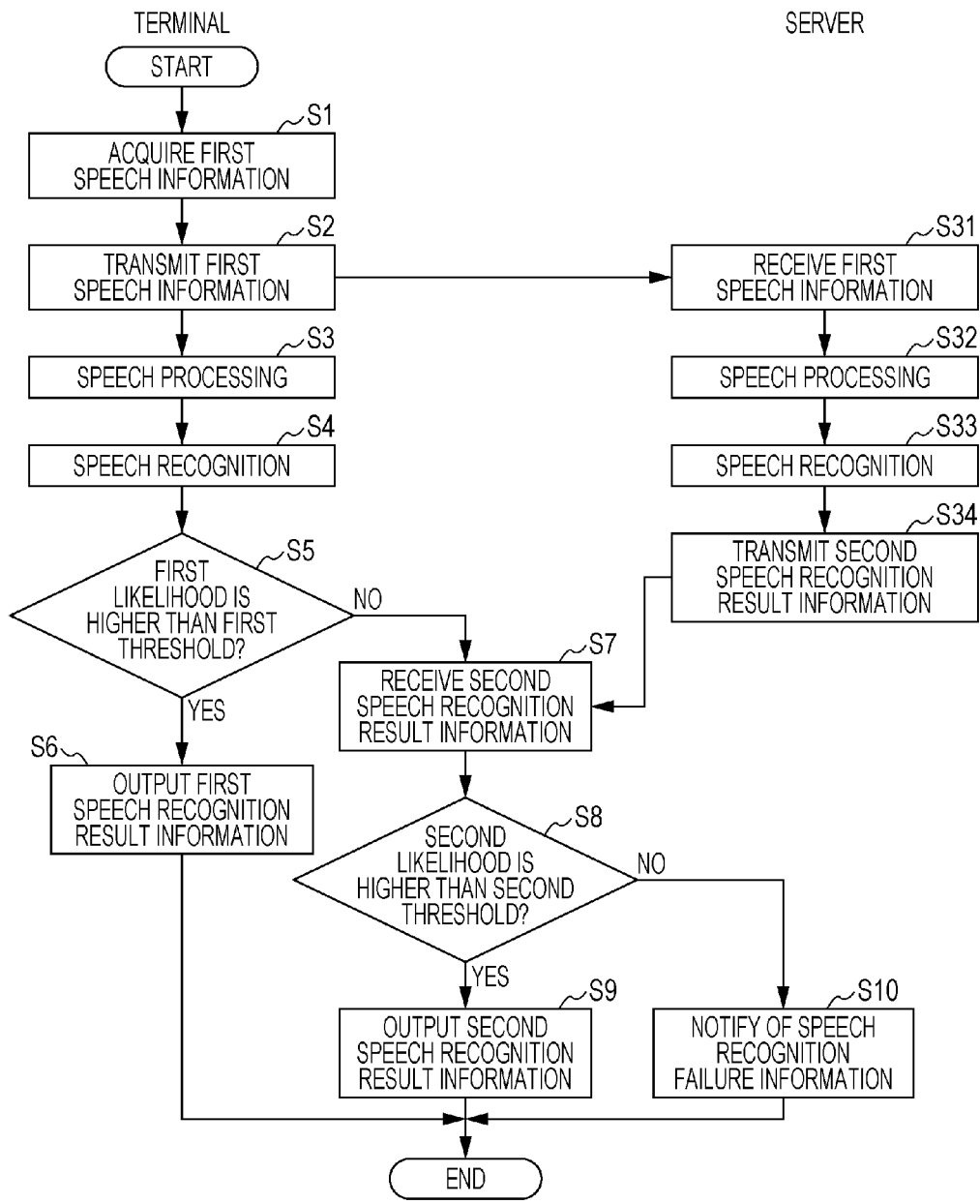

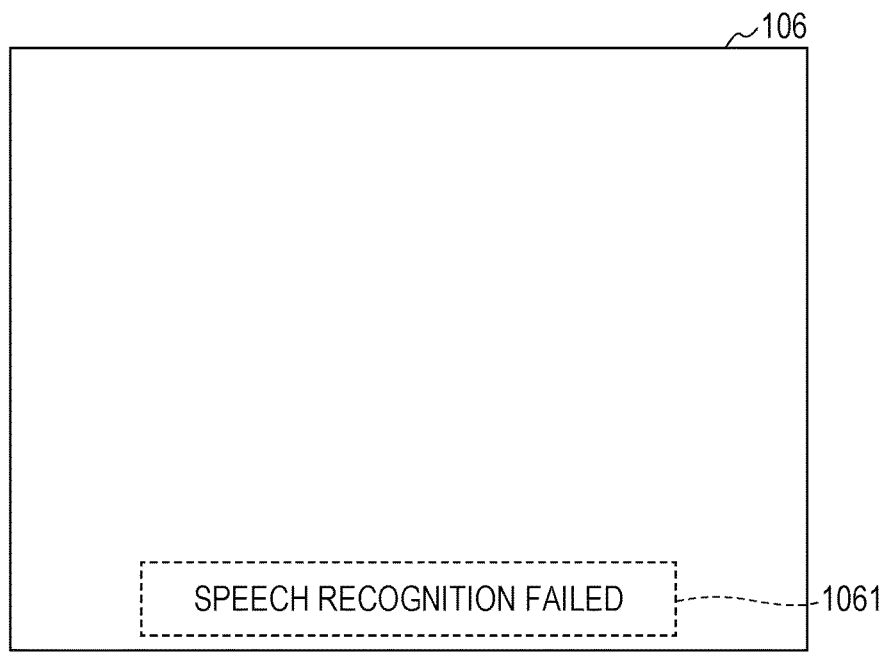
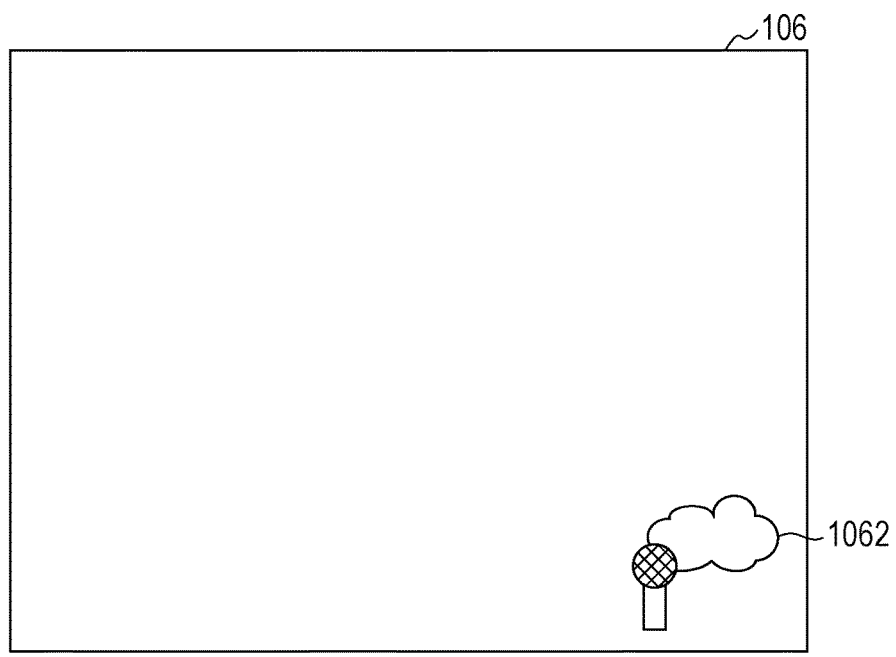

SPEECH RECOGNITION DEVICE AND METHOD

BACKGROUND

1. Technical Field

The present disclosure relates to a speech recognition device and method that remove noise contained in speech information and perform speech recognition on the noise-removed speech information.

2. Description of the Related Art

There has been considered a function of controlling a terminal on the basis of a speech or a function of searching for a keyword on the basis of a speech. These functions have been implemented by incorporating a microphone into a remote control that operates a terminal and collecting a speech using the microphone. To further improve ease of use, there has been considered in recent years a technology that incorporates a microphone into a terminal and allows the terminal to operate even when the user utters a speech from a location remote from the terminal. However, when the user utters a speech from a location remote from the terminal, the difference in volume between the speech uttered by the user and unwanted sound (noise) is eliminated, making it difficult for the terminal to accurately recognize the speech. While the speech recognition function of the terminal has been used to quickly respond to a speech related to a terminal operation, the speech recognition function of the server has been used to respond to a speech related to a search for information, which requires a dictionary having an enormous vocabulary.

For example, in Japanese Unexamined Patent Application Publication No. 2013-64777, a server and a client include dictionary size-prioritized speech recognition means and speed-prioritized speech recognition means, respectively, and these speech recognition means are used in combination.

SUMMARY

In one general aspect, the techniques disclosed here feature a speech recognition device including a speech acquisition unit that acquires first speech information, a noise removal unit that removes noise contained in the first speech information acquired by the speech acquisition unit using a first removal method and outputs the noise-removed speech information as second speech information, a speech recognition unit that performs speech recognition on the second speech information outputted by the noise removal unit and outputs a speech recognition result as first speech recognition result information, a communication unit that transmits the first speech information acquired by the speech acquisition unit to a server and receives a speech recognition result as second speech recognition result information from the server, the speech recognition result being a result obtained by performing speech recognition on third speech information, the third speech information being obtained by removing, in the server, noise contained in the first speech information using a second removal method that removes a larger amount of noise than an amount of noise removed from the first speech information using the first removal method, and a determination unit that makes a selection as to which of the first speech recognition result information outputted by the speech recognition unit and the second speech recognition result information received by the communication unit should be outputted.

It should be noted that general or specific embodiments may be implemented as a system, a method, an integrated circuit, a computer program, a storage medium, or any selective combination thereof.

According to the present disclosure, in a high-noise environment, noise is removed from the first speech information by the server that can remove a larger amount of noise than the speech recognition device. Thus, the accuracy of speech recognition can be improved. In a low-noise environment, noise is removed from the first speech information by the speech recognition device. Thus, speech recognition can be speeded up.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart showing an example of the operation of the speech recognition system according to the first embodiment of the present disclosure;

FIG. 4 is a diagram showing an example of the display screen showing speech recognition failure information;

FIG. 5 is a diagram showing an example of the display screen showing server transmission information;

DETAILED DESCRIPTION

Figure 1:
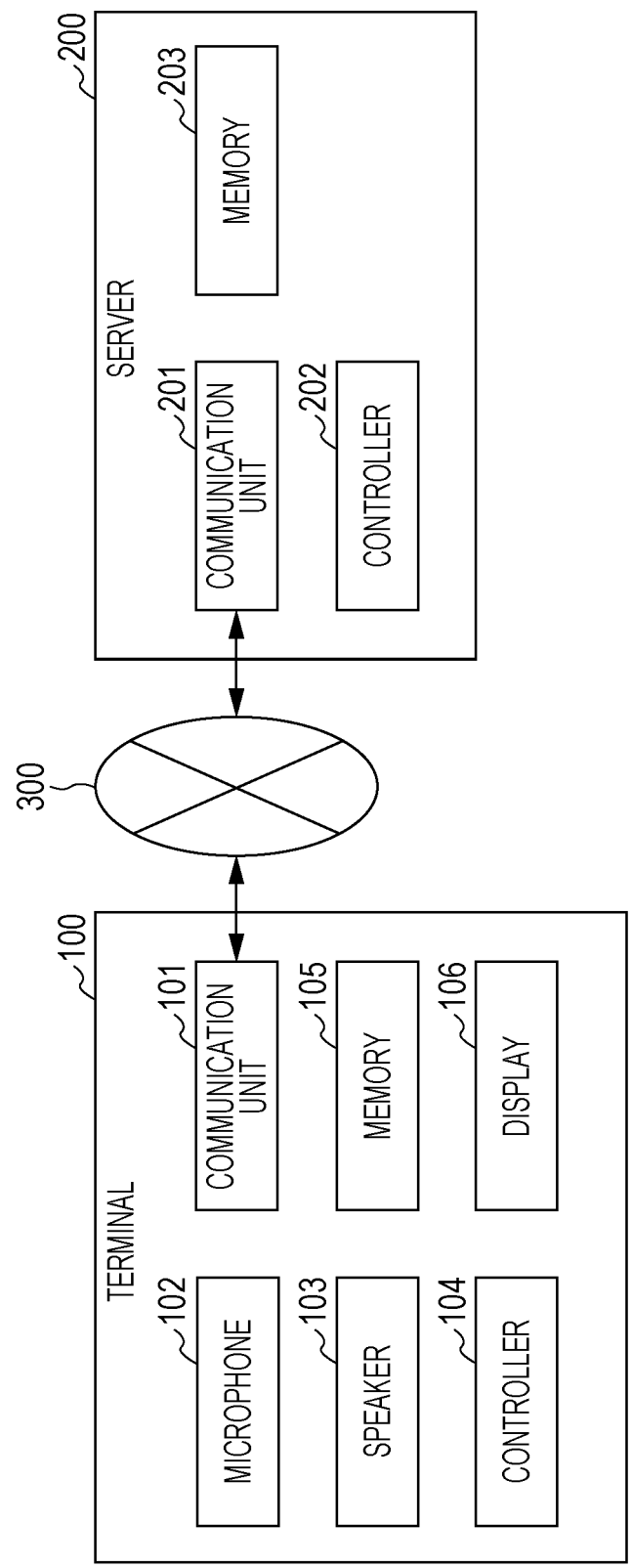
FIG. 1 is a diagram showing the overall configuration of a speech recognition system according to a first embodiment of the present disclosure.

Underlying Knowledge Forming Basis of the Present Disclosure

A problem of Japanese Unexamined Patent Application Publication No. 2013-64777 is that when the user utters a speech from a location remote from a microphone, noise enters the speech, and speech recognition is not performed accurately. Further, in Japanese Unexamined Patent Application Publication No. 2013-64777, noise removal is not shared by the terminal and server, nor is any configuration or condition for performing both noise removal and speech recognition considered.

One non-limiting and exemplary embodiment provides a speech recognition device and method that can improve the accuracy of speech recognition in a high-noise environment and can speed up speech recognition in a low-noise environment.

A speech recognition device according to one aspect of the present disclosure includes a speech acquisition unit that acquires first speech information, a noise removal unit that removes noise contained in the first speech information acquired by the speech acquisition unit using a first removal method and outputs the noise-removed speech information as second speech information, a speech recognition unit that performs speech recognition on the second speech information outputted by the noise removal unit and outputs a speech recognition result as first speech recognition result information, a communication unit that transmits the first speech information acquired by the speech acquisition unit to a server and receives a speech recognition result as second speech recognition result information from the server, the speech recognition result being a result obtained by performing speech recognition on third speech information, the third speech information being obtained by removing, in the server, noise contained in the first speech information using a second removal method that removes a larger amount of noise than an amount of noise removed from the first speech information using the first removal method, and a determination unit that makes a selection as to which of the first speech recognition result information outputted by the speech recognition unit and the second speech recognition result information received by the communication unit should be outputted.

According to this configuration, the first speech information is acquired. Noise contained in the acquired first speech information is removed using the first removal method, and the noise-removed speech information is outputted as the second speech information. Speech recognition is performed on the outputted second speech information, and the speech recognition result is outputted as the first speech recognition result information. The acquired first speech information is transmitted to the server. In the server, noise contained in the first speech information is removed using the second removal method that removes, from the first speech information, a larger amount of noise than the amount of noise removed from the first speech information using the first removal method. Speech recognition is performed on the noise-removed speech information serving as third speech information, and the speech recognition result is received as the second speech recognition result information from the server. A selection is made as to which of the outputted first speech recognition result information and the received second speech recognition result information should be outputted.

Thus, in a high-noise environment, noise is removed from the first speech information by the server that can remove a larger amount of noise than the speech recognition device and therefore the accuracy of speech recognition can be improved. In a low-noise environment, noise is removed from the first speech information by the speech recognition device and therefore speech recognition can be speeded up.

In the speech recognition device, the speech recognition unit may calculate a first likelihood indicating a likelihood of the first speech recognition result information and may output the calculated first likelihood to the determination unit. The communication unit may receive a second likelihood calculated by the server and indicating a likelihood of the second speech recognition result information and may output the received second likelihood to the determination unit. The determination unit may make a selection as to which of the first speech recognition result information and the second speech recognition result information should be outputted, on the basis of at least one of the first likelihood and the second likelihood.

According to this configuration, the first likelihood indicating the likelihood of the first speech recognition result information is calculated and then outputted. Further, the second likelihood calculated by the server and indicating the likelihood of the second speech recognition result information is received and then outputted. Then, a selection is made as to which of the first speech recognition result information and second speech recognition result information should be outputted, on the basis of at least one of the first likelihood and second likelihood.

As seen above, the speech recognition result to be outputted is selected on the basis of the likelihood. Thus, a more accurate speech recognition result can be outputted.

In the speech recognition device, if the first likelihood is higher than a predetermined first threshold, the determination unit may output the first speech recognition result information. If the first likelihood is lower than or equal to the first threshold and the second likelihood is higher than a predetermined second threshold, the determination unit may output the second speech recognition result information. If the first likelihood is lower than or equal to the first threshold and the second likelihood is lower than or equal to the second threshold, the determination unit need not output any of the first speech recognition result information and the second speech recognition result information.

According to this configuration, if the first likelihood is higher than the predetermined first threshold, the first speech recognition result information is outputted. If the first likelihood is lower than or equal to the first threshold and the second likelihood is larger than the predetermined second threshold, the second speech recognition result information is outputted. If the first likelihood is lower than or equal to the first threshold and the second likelihood is lower than or equal to the second threshold, any of the first speech recognition result information and second speech recognition result information is not outputted.

As seen above, the speech recognition result is selected on the basis of the comparison between the likelihood and threshold. Thus, the speech recognition result to be outputted can be selected using the simpler configuration.

The speech recognition device may further include a speech section detector that detects a section of a speech uttered by a user in the first speech information acquired by the speech acquisition unit. If the speech section is not detected by the speech section detector, the noise removal unit need not remove noise contained in the first speech information or output the second speech information, and the communication unit need not transmit the first speech information to the server.

According to this configuration, the section of the speech uttered by the user in the acquired first speech information is detected. If the speech section is not detected, noise contained in the first speech information is not removed. Further, the second speech information is not outputted, nor is the first speech information outputted to the server.

As seen above, if the section of the speech uttered by the user is not detected, noise contained in the first speech information is not removed. Further, the second speech information is not outputted, nor is the first speech information outputted to the server. Thus, it is possible to prevent the performance of an unnecessary computation, as well as to prevent the transmission of unnecessary information.

The speech recognition device may further include a speech continuation time measurement unit that if the speech section is detected by the speech section detector, measures a speech continuation time which is a continuation time of the speech section. If the speech section is detected by the speech section detector, the noise removal unit may remove noise contained in the first speech information, and the communication unit may transmit the first speech information in the speech section to the server. The determination unit may make a selection as to which of the first speech recognition result information outputted by the speech recognition unit and the second speech recognition result information received by the communication unit should be outputted, on the basis of at least information about a length of the speech continuation time.

According to this configuration, if the speech section is detected, the speech continuation time, which is the continuation time of the detected speech section, is measured. If the speech section is detected, noise contained in the first speech information is removed, and the first speech information in the speech section is transmitted to the server. Then, a selection is made as to which of the outputted first speech recognition result information and the received second speech recognition result information should be outputted, using at least information about the length of the speech continuation time.

As seen above, the speech recognition result is selected using at least information about the length of the speech continuation time. Thus, the speech recognition result to be outputted can be selected using the simpler configuration.

In the speech recognition device, if the speech continuation time is longer than a predetermined length, the determination unit may increase a weight by which the second likelihood indicating the likelihood of the second speech recognition result information is multiplied compared to a weight by which the first likelihood indicating the likelihood of the first speech recognition result information is multiplied.

According to this configuration, if the speech continuation time is longer than the predetermined length, the weight by which the second likelihood indicating the likelihood of the second speech recognition result information is multiplied is increased compared to the weight by which the first likelihood indicating the likelihood of the first speech recognition result information is multiplied. When the speech continuation time is long, a high level of speech instruction including many words may be being made. In this case, the speech recognition result outputted by the server is used. Thus, false recognition can be prevented.

In the speech recognition device, the communication unit may receive the third speech information from the server and may output the received third speech information to the speech recognition unit. The speech recognition unit may perform speech recognition on the third speech information received by the communication unit and may output a speech recognition result as fourth speech recognition result information. The communication unit may transmit the second speech information outputted by the noise removal unit to the server and may receive a speech recognition result as third speech recognition result information from the server, the speech recognition result being obtained by performing speech recognition on the second speech information, and may output the received third speech recognition result information to the determination unit. The determination unit may make a selection as to which of the first speech recognition result information outputted by the speech recognition unit, the second speech recognition result information received by the communication unit, the third speech recognition result information received by the communication unit, and the fourth speech recognition result information outputted by the speech recognition unit should be outputted.

According to this configuration, the third speech information is received from the server and then outputted to the speech recognition unit. Speech recognition is performed on the received third speech information, and the speech recognition result is outputted as the fourth speech recognition result information. Further, the outputted second speech information is transmitted to the server; speech recognition is performed on the second speech information; the speech recognition result is received as the third speech recognition result information from the server; and the received third speech recognition result information is outputted to the determination unit. Then, a selection is made as to which of the outputted first speech recognition result information, the received second speech recognition result information, the received third speech recognition result information, and the outputted fourth speech recognition result information should be outputted.

As seen above, one of the first speech recognition result information obtained by performing the noise removal process and speech recognition process using the speech recognition device, the second speech recognition result information obtained by performing the noise removal process and speech recognition process using the server, the third speech recognition result information obtained by performing the noise removal process using the speech recognition device and performing the speech recognition process using the server, and the fourth speech recognition result information obtained by performing the noise removal process using the server and performing the speech recognition process using the speech recognition device is outputted. Thus, it is possible to obtain an optimum speech recognition result according to the state of the environmental sound and the performance of speech recognition.

In the speech recognition device, the speech recognition unit may calculate a first likelihood indicating a likelihood of the first speech recognition result information and may output the calculated first likelihood to the determination unit. The communication unit may receive a second likelihood calculated by the server and indicating a likelihood of the second speech recognition result information and may output the received second likelihood to the determination unit. The communication unit may receive a third likelihood calculated by the server and indicating a likelihood of the third speech recognition result information and may output the received third likelihood to the determination unit. The speech recognition unit may calculate a fourth likelihood indicating a likelihood of the fourth speech recognition result information and may output the calculated fourth likelihood to the determination unit. The determination unit may make a selection as to which of the first speech recognition result information, the second speech recognition result information, the third speech recognition result information, and the fourth speech recognition result information should be outputted, on the basis of at least one of the first likelihood, the second likelihood, the third likelihood, and the fourth likelihood.

According to this configuration, the first likelihood indicating the likelihood of the first speech recognition result information is calculated and then outputted. Further, the second likelihood calculated by the server and indicating the likelihood of the second speech recognition result information is received and then outputted. Further, the third likelihood calculated by the server and indicating the likelihood of the third speech recognition result information is received and then outputted. Further, the fourth likelihood indicating the likelihood of the fourth speech recognition result information is calculated and then outputted. Then, a selection is made as to which of the first speech recognition result information, second speech recognition result information, third speech recognition result information, and fourth speech recognition result information should be outputted, on the basis of at least one of the first likelihood, second likelihood, third likelihood, and fourth likelihood.

As seen above, the speech recognition result to be outputted is selected on the basis of the likelihood. Thus, a more accurate speech recognition result can be outputted.

The speech recognition device may further include a speech section detector that detects a section of a speech uttered by a user in the first speech information acquired by the speech acquisition unit. If the speech section is not detected by the speech section detector, the noise removal unit need not remove noise contained in the first speech information or output the second speech information, and the communication unit need not transmit the first speech information to the server.

According to this configuration, the section of the speech uttered by the user in the acquired speech information is detected. If the speech section is not detected, noise contained in the first speech information is not removed, nor is the first speech information transmitted to the server.

As seen above, if the section of the speech uttered by the user is not detected, noise contained in the first speech information is not removed. Further, the second speech information is not outputted, nor is the first speech information transmitted to the server. Thus, it is possible to prevent the performance of an unnecessary computation, as well as to prevent the transmission of unnecessary information.

The speech recognition device may further include a speech continuation time measurement unit that if the speech section is detected by the speech section detector, measures a speech continuation time which is a continuation time of the speech section. If the speech section is detected by the speech section detector, the noise removal unit may remove noise contained in the first speech information, and the communication unit may transmit the first speech information in the speech section to the server. The determination unit may make a selection as to which of the first speech recognition result information, the second speech recognition result information, the third speech recognition result information, and the fourth speech recognition result information should be outputted, using at least information about a length of the speech continuation time.

According to this configuration, if the speech section is detected, the speech continuation time, which is the continuation time of the detected speech section, is measured. If the speech section is detected, noise contained in the first speech information is removed, and the first speech information in the speech section is transmitted to the server. Then, a selection is made as to which of the first speech recognition result information, second speech recognition result information, third speech recognition result information, and fourth speech recognition result information should be outputted, using at least information about the length of the speech continuation time.

As seen above, the speech recognition result is selected using information about at least the length of the speech continuation time. Thus, the speech recognition result to be outputted can be selected using the simpler configuration.

In the speech recognition device, if the speech continuation time is longer than a predetermined length, the determination unit may increase weights by which a second likelihood indicating a likelihood of the second speech recognition result information and a third likelihood indicating a likelihood of the third speech recognition result information are multiplied compared to weights by which a first likelihood indicating a likelihood of the first speech recognition result information and a fourth likelihood indicating a likelihood of the fourth speech recognition result information are multiplied.

According to this configuration, if the speech continuation time is longer than the predetermined length, the weights by which the second likelihood indicating the likelihood of the second speech recognition result information and the third likelihood indicating the likelihood of the third speech recognition result information are multiplied are increased compared to the weights by which the first likelihood indicating the likelihood of the first speech recognition result information and the fourth likelihood indicating the likelihood of the fourth speech recognition result information are multiplied. When the speech continuation time is long, a high level of speech instruction including many words may be being made. In this case, the speech recognition result calculated by the server is used. Thus, false recognition can be prevented.

In the speech recognition device, if the speech continuation time is longer than the predetermined length, the determination unit may increase the weight by which the second likelihood is multiplied compared to the weight by which the third likelihood is multiplied.

According to this configuration, if the speech continuation time is longer than the predetermined length, the weight by which the second likelihood is multiplied is increased compared to the weight by which the third likelihood is multiplied.

Thus, higher priority is given to the second speech recognition result information obtained by performing the noise removal process and speech recognition process using the server than to the third speech recognition result information obtained by performing the noise removal process using the speech recognition device and performing the speech recognition process using the server. As a result, false recognition can be prevented.

A speech recognition device according to another aspect of the present disclosure includes a speech acquisition unit that acquires first speech information, a noise removal unit that removes noise contained in the first speech information acquired by the speech acquisition unit using a first removal method and outputs the noise-removed speech information as second speech information, a communication unit that transmits the first speech information acquired by the speech acquisition unit to a server and receives noise-removed speech information as third speech information from the server, the noise-removed speech information being obtained by removing, in the server, noise contained in the first speech information using a second removal method that removes a larger amount of noise than an amount of noise removed from the first speech information using the first removal method, a speech recognition unit that performs speech recognition on the second speech information outputted by the noise removal unit and outputs a speech recognition result as first speech recognition result information, as well as performs speech recognition on the third speech information received by the communication unit and outputs a speech recognition result as second speech recognition result information, and a determination unit that makes a selection as to which of the first speech recognition result information and the second speech recognition result information outputted by the speech recognition unit should be outputted.

According to this configuration, the first speech information is acquired. Noise contained in the acquired first speech information is removed using the first removal method, and the noise-removed speech information is outputted as the second speech information. The acquired first speech information is transmitted to the server; in the server, noise contained in the first speech information is removed using the second removal method that removes, from the first speech information, a larger amount of noise than the amount of noise removed from the first speech information using the first removal method; and the noise-removed speech information is received as the third speech information from the server. Speech recognition is performed on the outputted second speech information, and the speech recognition result is outputted as the first speech recognition result information. Speech recognition is performed on the received third speech information, and the speech recognition result is outputted as the second speech recognition result information. A selection is made as to which of the outputted first speech recognition result information and second speech recognition result information should be outputted.

Thus, in a high-noise environment, noise is removed by the server that can remove a larger amount of noise than the speech recognition device and therefore the accuracy of speech recognition can be improved. In a low-noise environment, noise is removed by the speech recognition device and therefore speech recognition can be speeded up.

A speech recognition method according to yet another aspect of the present disclosure is a method by which a server performs speech recognition on speech information acquired by a terminal, the server including a communication unit, a noise removal unit, a speech recognition unit, and a determination unit. The method includes the communication unit receiving first speech information acquired by the terminal, the noise removal unit removing noise contained in the received first speech information using a first removal method and outputting the noise-removed speech information as second speech information, the speech recognition unit performing speech recognition on the second speech information and outputting a speech recognition result as first speech recognition result information, the communication unit receiving a speech recognition result as second speech recognition result information from the terminal, the speech recognition result being a result obtained by performing speech recognition on third speech information, the third speech information being obtained by removing, in the terminal, noise contained in the first speech information using a second removal method that removes a smaller amount of noise than an amount of noise removed from the first speech information using the first removal method, and the determination unit making a selection as to which of the first speech recognition result information and the second speech recognition result information should be outputted.

According to this configuration, the first speech information is received. Noise contained in the received first speech information is removed using the first removal method, and the noise-removed speech information is outputted as the second speech information. Speech recognition is performed on the outputted second speech information, and the speech recognition result is outputted as the first speech recognition result information. In the terminal, noise contained in the first speech information is removed using the second removal method that removes, from the first speech information, a smaller amount of noise than the amount of noise removed from the first speech information using the first removal method, and speech recognition is performed on the noise-removed speech information serving as the third speech information. The speech recognition result is received as the second speech recognition result information from the terminal. A selection is made as to which of the outputted first speech recognition result information and the received second speech recognition result information should be outputted.

Thus, in a high-noise environment, noise is removed from the first speech information by the server that can remove a larger amount of noise than the speech recognition device and therefore the accuracy of speech recognition can be improved. In a low-noise environment, noise is removed from the first speech information by the speech recognition device and therefore speech recognition can be speeded up.

Now, embodiments of the present disclosure will be described with reference to the accompanying drawings. Note that the embodiments below are only illustrative of the present disclosure and do not limit the technical scope of the present disclosure.

First Embodiment

FIG. 1 is a diagram showing the overall configuration of a speech recognition system according to a first embodiment of the present disclosure.

The speech recognition system shown in FIG. 1 includes a terminal 100 and a server 200. The terminal 100 is connected with the server 200 through a network (e.g., Internet) 300 in such a manner that they can communicate with each other.

The terminal 100 is, for example, a device that controls a television, air conditioner, or the like disposed in a home. The terminal 100 recognizes a speech uttered in a predetermined language and controls the television or the like on the basis of the result of the speech recognition. For example, the terminal 100 may be separate from the apparatus to be controlled (e.g., the television, air conditioner, or the like disposed in the home) or may be included in the apparatus to be controlled. The terminal 100 includes a communication unit 101, a microphone 102, a speaker 103, a controller 104, a memory 105, and a display 106. Note that the microphone 102, speaker 103, and display 106 need not be included in the terminal 100.

The communication unit 101 transmits information to the server 200 through the network 300 and receives information from the server 200 through the network 300. The communication unit 101 may be connected to the network 300 by any means. The microphone 102 collects ambient sound to acquire speech information. The speaker 103 outputs a speech.

The controller 104 includes, for example, a central processing unit (CPU). The CPU serves as the controller 104 by executing a control program stored in the memory 105 (to be discussed later). For example, the controller 104 processes various types of data (information) received by the communication unit 101 and controls the operations of the elements in the terminal 100.

The memory 105 is, for example, a read only memory (ROM), random access memory (RAM), or hard disk drive (HDD). The memory 105 stores data (information) received by the communication unit 101, data (information) processed by the controller 104, control program, or the like. The display 106 is, for example, a liquid crystal display and displays various types of information.

The terminal 100 may include a translator (not shown) that translates words or text which is the result of speech recognition into words or text in another language. For example, the translation made by the translator may be displayed on the display 106. The translation made by the translator may also be displayed on the display screen of the apparatus controlled by the terminal 100, such as the television or the like disposed in the home.

The server 200 includes a communication unit 201, a controller 202, and a memory 203.

The communication unit 201 transmits information to the terminal 100 through the network 300 and receives information from the terminal 100 through the network 300.

The controller 202 includes, for example, a CPU. The CPU serves as the controller 202 by executing a control program stored in the memory 203 (to be discussed later). For example, the controller 202 processes various types of data (information) received by the communication unit 201 and controls the operations of the elements in the server 200.

The memory 203 is, for example, a ROM, RAM, or HDD. The memory 203 stores data (information) received by the communication unit 201, data (information) processed by the controller 202, control program, or the like.

Figure 2:
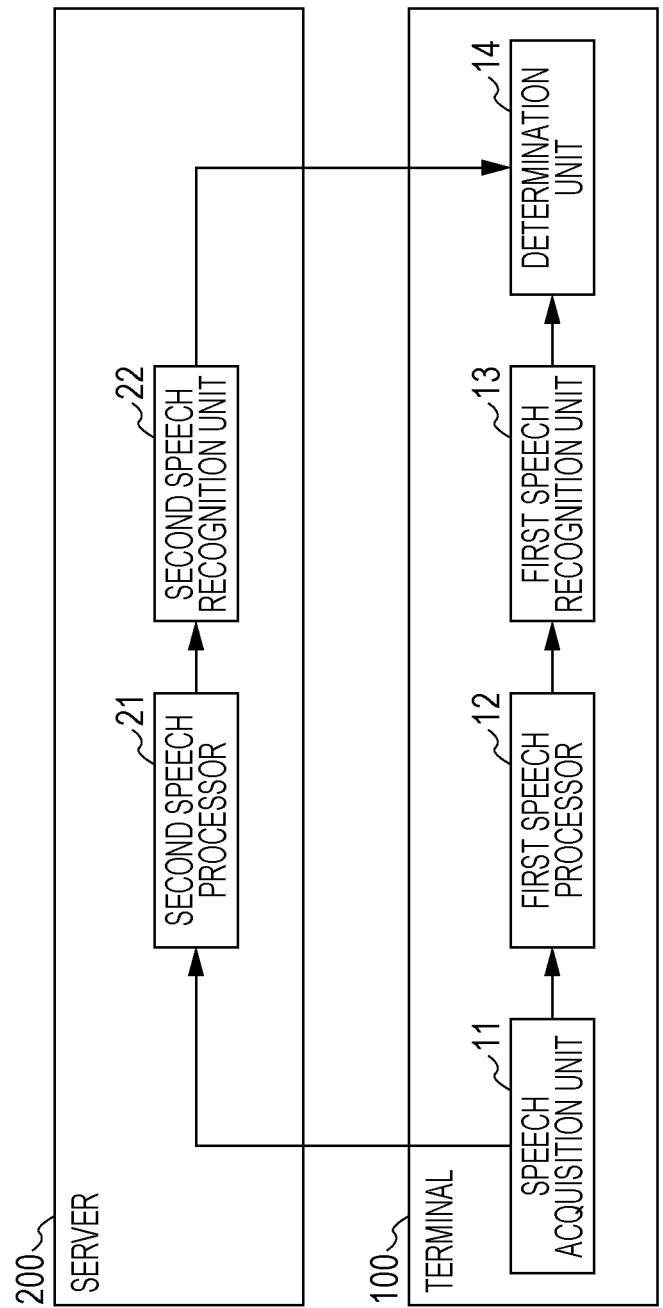
FIG. 2 is a diagram showing the functional configuration of the speech recognition system according to the first embodiment of the present disclosure.

FIG. 2 is a diagram showing the functional configuration of the speech recognition system according to the first embodiment of the present disclosure. As shown in FIG. 2, the speech recognition system includes the terminal 100 and server 200. The terminal 100 includes a speech acquisition unit 11, a first speech processor 12, a first speech recognition unit 13, and a determination unit 14. The server 200 includes a second speech processor 21 and a second speech recognition unit 22.

The speech acquisition unit 11 is implemented by the microphone 102, and the first speech processor 12, first speech recognition unit 13, and determination unit 14 are implemented by the controller 104. The second speech processor 21 and second speech recognition unit 22 are implemented by the controller 202.

The speech acquisition unit 11 acquires first speech information. As used herein, speech information is, for example, the signal waveform of a speech and may be the feature value of the speech obtained by analyzing the frequency of the signal waveform. The communication unit 101 (not shown) transmits the first speech information acquired by the speech acquisition unit 11 to the server 200. The communication unit 201 of the server 200 receives the first speech information transmitted by the terminal 100.

The first speech processor 12 removes noise contained in the first speech information acquired by the speech acquisition unit 11 using a first removal method and outputs the noise-removed speech information as second speech information.

The first speech recognition unit 13 performs speech recognition on the second speech information outputted by the first speech processor 12 and outputs the speech recognition result as first speech recognition result information. The first speech recognition unit 13 also calculates a first likelihood indicating the likelihood of the first speech recognition result information and outputs the calculated first likelihood along with the first speech recognition result information to the determination unit 14.

The first speech recognition unit 13 performs speech recognition on the second speech information, which is the speech information noise-removed by the first speech processor 12. The first speech recognition unit 13 performs speech recognition on the second speech information with reference to previously stored acoustic and language models and a terminal dictionary. The speech recognition result includes character string data composed of multiple words. The first likelihood indicates the likelihood of the speech recognition result of the second speech information. More specifically, the first likelihood indicates the likelihood of the entire character string data or the likelihood of each word included in the character string data.

The first speech recognition unit 13 calculates the degree of matching (likelihood) between a speech obtained from the second speech information and each of multiple words contained in the terminal dictionary. The first speech recognition unit 13 then selects a word matching the speech to the highest degree from among the words contained in the terminal dictionary and incorporates the selected word into the speech recognition result.

If the speech includes multiple words, the first speech recognition unit 13 selects a dictionary word matching the respective words to the highest degree and incorporates the selected dictionary word into the speech recognition result.

The first speech recognition unit 13 defines the likelihood corresponding to the selected word as the first likelihood.

If the speech recognition result includes multiple words, the first speech recognition unit 13 may calculate a likelihood corresponding to the entire multiple words on the basis of likelihoods corresponding to the respective words and may define the calculated likelihood as the first likelihood.

The value of the first likelihood becomes higher as the degree of matching between the word selected by the first speech recognition unit 13 and the speech becomes higher.

The first speech recognition unit 13 outputs the speech recognition result as the first speech recognition result information and the first likelihood to the determination unit 14. The terminal dictionary stored in the terminal 100 is a dictionary in which words to be recognized are registered and listed. For example, the terminal dictionary mainly contains words for controlling the operation of the terminal 100. Also, the terminal dictionary may contain words that the terminal 100 uses to control the device disposed in the house.

The second speech processor 21 removes noise contained in the first speech information received by the communication unit 201 using a second removal method that removes a higher level (or a larger amount) of noise than that of noise removed by the first removal method. In other words, the first speech processor 12 removes noise contained in the first speech information using the first removal method that removes a lower level (or a smaller amount) of noise than that of noise removed by the second method.

The second speech processor 21 removes noise from the first speech information using the second removal method and outputs the noise-removed speech information as third speech information. The second speech processor 21 removes a larger amount of noise from the first speech information than that of noise removed by the first speech processor 12.

The second speech recognition unit 22 performs speech recognition on the third speech information outputted by the second speech processor 21 and outputs the speech recognition result as second speech recognition result information. The second speech recognition unit 22 also calculates a second likelihood indicating the likelihood of the second speech recognition result information and outputs the calculated second likelihood along with the second speech recognition result information to the communication unit 201.

The communication unit 201 transmits the second speech recognition result information and the second likelihood outputted by the second speech recognition unit 22 to the terminal 100. The communication unit 101 of the terminal 100 receives the second speech recognition result information transmitted by the server 200. The communication unit 101 also receives the second likelihood calculated by the server 200 and indicating the likelihood of the second speech recognition result information and outputs the received second likelihood to the determination unit 14.

The second speech recognition unit 22 performs speech recognition on the third speech information, which is the speech information noise-removed by the second speech processor 21. The second speech recognition unit 22 performs speech recognition on the third speech information with reference to previously stored acoustic and language models and a server dictionary. The speech recognition result includes character string data composed of multiple words. The second likelihood indicates a likelihood of the speech recognition result of the third speech information (i.e., second speech recognition result information). More specifically, the second likelihood indicates the likelihood of the entire character string data or the likelihood of each word included in the character string data.

The second speech recognition unit 22 calculates the degree of matching (likelihood) between a speech obtained from the third speech information and each of multiple words contained in the server dictionary. The second speech recognition unit 22 then selects a word matching the speech to the highest degree from among the words contained in the server dictionary and incorporates the selected word into the speech recognition result.

If the speech includes multiple words, the second speech recognition unit 22 selects a dictionary word matching the respective words to the highest degree and incorporates the selected dictionary word into the speech recognition result.

The second speech recognition unit 22 defines the likelihood corresponding to the selected word as the second likelihood.

If the speech recognition result includes multiple words, the second speech recognition unit 22 may calculate a likelihood corresponding to the entire multiple words on the basis of likelihoods corresponding to the respective words and may define the calculated likelihood as the second likelihood.

The value of the second likelihood becomes higher as the degree of matching between the word selected by the second speech recognition unit 22 and the speech becomes higher.

The second speech recognition unit 22 then transmits the speech recognition result as second speech recognition result information and the second likelihood to the terminal 100 via the communication unit 201. The second speech recognition unit 22 also transmits the second likelihood to the terminal 100 via the communication unit 201. Also, the communication unit 101 transmits the second speech recognition result information and the second likelihood to the determination unit 14.

The second speech recognition unit 22 calculates the second threshold when it performs speech recognition on the third speech information. Accordingly, the second speech recognition unit 22 may transmit second speech recognition result information including the second likelihood to the terminal 100 via the communication unit 201.

The server dictionary stored in the server 200 is a dictionary in which words to be recognized are registered and listed. The server dictionary contains words for controlling the operation of the terminal 100, as well as various search keywords and the like. The server dictionary has a larger vocabulary than the terminal dictionary. The server dictionary may contain words that the terminal 100 uses to control the device. The vocabulary of the server dictionary is, for example, one hundred thousand to several hundred thousand words, whereas that of the terminal dictionary is, for example, several tens to several hundred words.

The difference between the first speech processor 12 and second speech processor 21 will be described below. The first speech processor 12 removes noise by performing signal processing using the power of the speech signals or the correlation therebetween. On the other hand, the second speech processor 21 performs the above signal processing, as well as statistically models a signal indicating a speech or a signal indicating noise and removes noise using the probabilistic likelihood of a signal to be separated.

In modeling, it is necessary to previously determine a parameter for dividing the first speech information (speech signals) received by the second speech processor 21 into a speech signal corresponding to the speech of the utterer and a signal corresponding to noise. For example, the second speech processor 21 previously performs a process including: first determining a parameter necessary for modeling; then applying the above model to first speech information obtained when the utterer utters a speech in a high-noise environment; removing a signal corresponding to noise; and evaluating the resulting speech signal. Alternatively, the second speech processor 21 may previously perform a process including: processing, as does the first speech processor 12, first speech information obtained when the utterer utters a speech in a high-noise environment; applying the above model to the resulting noise-removed speech signal; removing a signal corresponding to noise; and evaluating the resulting speech signal.

If the evaluation value of the resulting speech signal is lower than a predetermined evaluation value, the second speech processor 21 modifies the parameter, again removes a signal corresponding to noise from first speech information obtained when the utterer utters a speech in a high-noise environment, and evaluates the resulting speech signal. In contrast, if the evaluation value of the resulting speech signal is higher than the predetermined evaluation value, the second speech processor 21 holds the parameter used to obtain the speech signals as a parameter used when it performs processing (as a previously learned parameter).

The second speech processor 21 then statistically models a signal indicating a speech or a signal indicating noise using the previously learned parameter and holds the previously learned parameter. The previously learned parameter is a parameter suitable for statistically modeling a signal indicating a speech or a signal indicating noise contained in first speech information obtained by the terminal 100 when the utterer utters a speech in a high-noise environment and for removing noise using the probabilistic likelihood of a signal to be separated.

When speech recognition is actually required, the second speech processor 21 uses the previously learned parameter to statistically model a signal indicating a speech or a signal indicating noise and to remove noise from the first speech information using the probabilistic likelihood of a signal to be separated. At this time, the second speech processor 21 may update the previously learned parameter using the first speech information acquired from the terminal 100 as necessary. Thus, the previously learned parameter is updated to a parameter more suitable for the environment in which the utterer is uttering a speech.

According to general knowledge, a larger amount of noise is removed by using the method including statistically modeling a signal indicating a speech or a signal indicating noise and removing noise from the first speech information using the probabilistic likelihood of a signal to be separated than by using the method including removing noise from the first speech information by performing signal processing using the power of speech signals or the correlation therebetween.

As the matter of course, by removing noise from the first speech information by performing signal processing using the power of speech signals or the correlation therebetween and then by statistically modeling a signal indicating a speech or a signal indicating noise contained in the noise-removed first speech information and removing noise using the probabilistic likelihood of a signal to be separated, a larger amount of noise can be removed from the first speech information than by only performing the method including removing noise from the first speech information by performing signal processing using the power of the speech signals or the correlation therebetween.

That is, the second speech processor 21 removes a larger amount of noise than the first speech processor 12. For this reason, the second speech processor 21 can sufficiently remove noise even in a high-noise environment and extract only a speech uttered by the user. For example, the second speech processor 21 holds more previously learned parameters and performs more computations than the first speech processor 12. For this reason, the second speech processor 21 takes a longer time to remove noise than the first speech processor 12, for example, by about several tens to several hundred ms. While the second speech processor 21 can update the noise removal algorithm in real time, the first speech processor 12 has to update the program in order to update the noise removal algorithm.

As described above, the first speech processor 12 removes noise using the power of speech signals or the correlation therebetween, and the second speech processor 21 statistically models a signal indicating a speech or a signal indicating noise and removes noise using the probabilistic likelihood of a signal to be separated. However, these speech processors may remove noise otherwise. That is, the first speech processor 12 and second speech processor 21 may remove noise using any methods as long as the second speech processor 21 removes a larger amount of noise than the first speech processor 12 from the first speech information.

The difference between the first speech recognition unit 13 and second speech recognition unit 22 will be described below. As described above, the vocabulary of the dictionary used for speech recognition varies between the first speech recognition unit 13 and second speech recognition unit 22, and the server dictionary has a larger vocabulary than the terminal dictionary. Accordingly, the second speech recognition unit 22 can recognize a larger number of words than the first speech recognition unit 13.

Note that the first speech recognition unit 13 may only convert a speech into characters without using the dictionary. The second speech recognition unit 22 takes a longer time to recognize a speech than the first speech recognition unit 13, for example, by about several tens to several hundred ms. While the second speech recognition unit 22 can update the speech recognition algorithm in real time, the first speech recognition unit 13 has to update the program in order to update the speech recognition algorithm.

The determination unit 14 makes a selection as to which of the first speech recognition result information outputted by the first speech recognition unit 13 and the second speech recognition result information received by the communication unit 101 should be outputted. The determination unit 14 makes this selection on the basis of at least one of the first likelihood and second likelihood.

Specifically, if the first likelihood is higher than a predetermined first threshold, the determination unit 14 outputs the first speech recognition result information. If the first likelihood is lower than or equal to the first threshold and the second likelihood is larger than a predetermined second threshold, the determination unit 14 outputs the second speech recognition result information. If the first likelihood is lower than or equal to the first threshold and the second likelihood is lower than or equal to the second threshold, the determination unit 14 does not output any of the first speech recognition result information and second speech recognition result information. For example, the first threshold and the second threshold are previously stored in the memory 105 of the terminal 100.

When the determination unit 14 receives one of the first speech recognition result information and second speech recognition result information earlier than the other, it makes a comparison between the likelihood and threshold of the earlier received information. For example, when the determination unit 14 receives the first speech recognition result information earlier than the second speech recognition result information, it makes a comparison between the first likelihood and first threshold of the first speech recognition result information. If the first likelihood is higher than the first threshold, the determination unit 14 outputs the first speech recognition result information.

In contrast, if the first likelihood is lower than or equal to the first threshold, the determination unit 14 waits until it receives the second speech recognition result information. Subsequently, when the determination unit 14 receives the second speech recognition result information, it makes a comparison between the second likelihood and second threshold of the second speech recognition result information.

If the second likelihood is higher than the second threshold, the determination unit 14 outputs the second speech recognition result information. In contrast, if the second likelihood is lower than or equal to the second threshold, the determination unit 14 determines that it has failed to obtain a satisfactory speech recognition result and therefore does not output any of the first speech recognition result information and second speech recognition result information. This process also holds true when the determination unit 14 receives the second speech recognition result information earlier than the first speech recognition result information.

FIG. 3 is a flowchart showing an example of the operation of the speech recognition system according to the first embodiment of the present disclosure.

In step S1, the speech acquisition unit 11 of the terminal 100 acquires the first speech information.

In step S2, the communication unit 101 transmits the first speech information acquired by the speech acquisition unit 11 to the server 200.

In step S3, the first speech processor 12 removes noise contained in the first speech information acquired by the speech acquisition unit 11 and outputs the noise-removed speech information as second speech information.

In step S4, the first speech recognition unit 13 performs speech recognition on the second speech information outputted by the first speech processor 12 and outputs the speech recognition result as first speech recognition result information to the determination unit 14. Also, the first speech recognition unit 13 outputs a first likelihood indicating the likelihood of the first speech recognition result information to the determination unit 14.

In step S5, the determination unit 14 determines whether the first likelihood indicating the likelihood of the first speech recognition result information is higher than the first threshold. Note that the first threshold is a threshold with which the determination unit 14 can determine that the first speech recognition result information is an accurate recognition result. If the determination unit 14 determines that the first likelihood is higher than the first threshold (YES in step 35), it outputs the first speech recognition result information in step S6.

In contrast, if the determination unit 14 determines that the first likelihood is lower than or equal to the first threshold (NO in step S5), the process proceeds to step S7.

The server 200 performs steps S31 to S34 while the terminal 100 performs steps S3 to S5.

In step S31, the communication unit 201 of the server 200 receives the first speech information transmitted by the terminal 100.

In step S32, the second speech processor 21 removes noise contained in the first speech information received by the communication unit 201 and outputs the noise-removed speech information as third speech information.

In step S33, the second speech recognition unit 22 performs speech recognition on the third speech information outputted by the second speech processor 21 and outputs the speech recognition result as second speech recognition result information to the communication unit 201. The second speech recognition unit 22 outputs a second likelihood indicating the likelihood of the second speech recognition result information to the communication unit 201.

In step S34, the communication unit 201 transmits the second speech recognition result information and the second likelihood outputted by the second speech recognition unit 22 to the terminal 100.

In step S7, the communication unit 101 of the terminal 100 receives the second speech recognition result information and the second likelihood transmitted by the server 200. The communication unit 101 outputs the second speech recognition result information and the second likelihood to the determination unit 14.

In step S8, the determination unit 14 determines whether the second likelihood indicating the likelihood of the second speech recognition result information is higher than the second threshold. Note that the second threshold is a threshold with which the determination unit 14 can determine that the second speech recognition result information is an accurate recognition result. If the determination unit 14 determines that the second likelihood is higher than the second threshold (YES in step S8), it outputs the second speech recognition result information in step S9.

In contrast, if the determination unit 14 determines that the second likelihood is lower than or equal to the second threshold (NO in step S8), the display 106 notifies the user of speech recognition failure information indicating that speech recognition has failed, in step S10.

FIG. 4 is a diagram showing an example of the display screen showing speech recognition failure information.

If the determination unit 14 determines that the first likelihood is lower than or equal to the first threshold and the second likelihood is lower than or equal to the second threshold, the display 106 shows speech recognition failure information 1061 on the display screen, as shown in FIG. 4. In FIG. 4, the speech recognition failure information 1061 is character information indicating that "speech recognition failed."

While, in the present embodiment, the terminal 100 notifies the user of the speech recognition failure information by showing the information on the display 106, the terminal 100 may notify the user otherwise. For example, the terminal may notify the user by outputting sound from the speaker 103.

Further, in the present embodiment, the terminal 100 may notify the user of server transmission information indicating that the first speech information is being transmitted to the server 200.

FIG. 5 is a diagram showing an example of the display screen showing server transmission information.

As shown in FIG. 5, when the first speech information is transmitted to the server 200, the display 106 shows server transmission information 1062 on the display screen. In FIG. 5, the server transmission information 1062 is an icon indicating that the speech information is being transmitted through the network. The display of the server transmission information 1062 may be started when the transmission of the first speech information is started and ended when the transmission is ended. Alternatively, the display of the server transmission information 1062 may be started when the transmission of the first speech information is started and ended when the second speech recognition result information is received.

Some users may not want to transmit speech information to the server 200. For this reason, it is preferred to present such users with transmission inquiry information for previously inquiring about whether speech information should be transmitted to the server 200.

Figure 6:
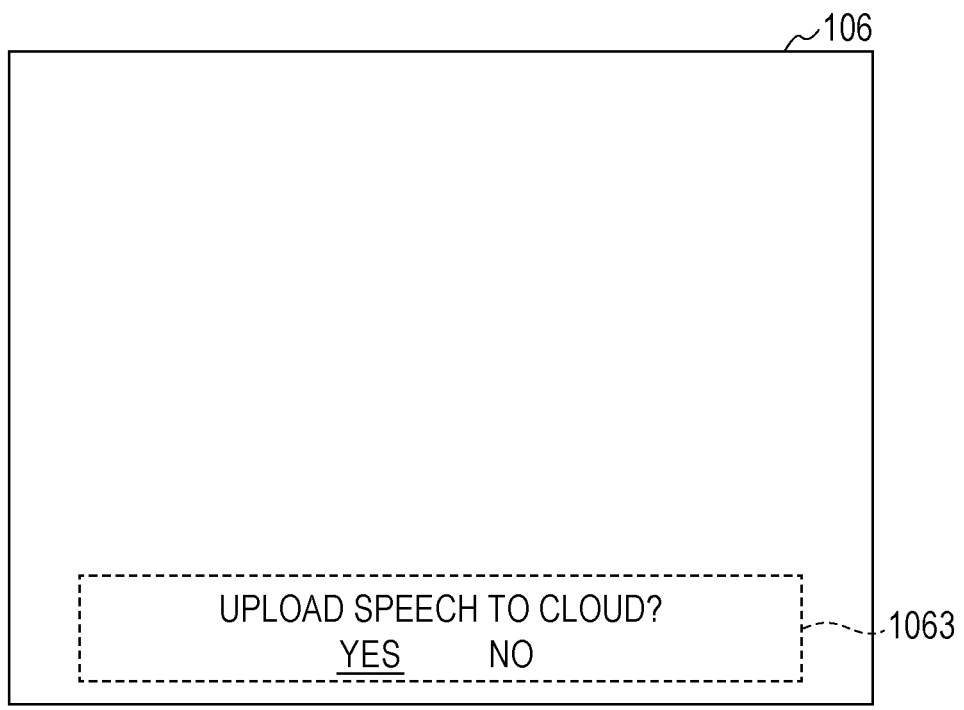
FIG. 6 is a diagram showing an example of the display screen showing transmission inquiry information.

FIG. 6 is a diagram showing an example of the display screen showing transmission inquiry information.

As shown in FIG. 6, the display 106 shows transmission inquiry information 1063 on the display screen at the initial settings. In FIG. 6, the transmission inquiry information 1063 is character information indicating that "Upload the speech to cloud?". The transmission inquiry information 1063 may be displayed at the initial settings of the terminal 100 or may be displayed when the terminal 100 first transmits the first speech information.

While, in the present embodiment, the first speech recognition unit 13 outputs the first speech recognition result information and first likelihood to the determination unit 14, other configurations may be employed.

The first speech recognition unit 13 calculates the first likelihood when it performs speech recognition on the second speech information. For example, the first speech recognition unit 13 may output first speech recognition result information including the speech recognition result of the second speech information and the first likelihood to the determination unit 14.

In this case, the determination unit 14 retrieves the speech recognition result of the second speech information and the first likelihood from the first speech recognition result information as necessary and performs processing.

While, in the present embodiment, the second speech recognition unit 22 outputs the second speech recognition result information and second likelihood to the communication unit 201, other configurations may be employed.

The second speech recognition unit 22 calculates the second likelihood when it performs speech recognition on the third speech information. For example, the second speech recognition unit 22 may output second speech recognition result information including the speech recognition result of the third speech information and the second likelihood to the communication unit 201.

In this case, one of the communication unit 201, communication unit 101, and determination unit 14 retrieves the speech recognition result of the third speech information or the second likelihood from the second speech recognition result information as necessary and performs processing.

While, in the present embodiment, the first speech recognition unit 13 outputs the first speech recognition result information and first likelihood to the determination unit 14 and the communication unit 101 outputs the second speech recognition result information and the second likelihood transmitted by the server 200 to the determination unit 14, other configurations may be employed.

For example, when the determination unit 14 receives the first likelihood, it may determine whether it should output the first speech recognition result information, in accordance with the result of a comparison with a previously held first threshold.

When the determination unit 14 receives the second likelihood, it may determine whether it should output the second speech recognition result information, in accordance with the result of a comparison with a previously held second threshold.

For example, the first speech recognition unit 13 may store the first speech recognition result information in the memory 105 of the terminal 100 rather than outputting it to the determination unit 14. In this case, the first speech recognition unit 13 outputs the first likelihood to the determination unit 14.

For example, the communication unit 101 may store the second speech recognition result information in the memory 105 of the terminal 100 rather than outputting it to the determination unit 14. In this case, the communication unit 101 outputs the second likelihood to the determination unit 14.

The determination unit 14 may retrieve the first speech recognition result information or second speech recognition result information that it has determined that it should output, from the memory 105 and may output it. If the determination unit 14 determines that it should not output the first speech recognition result information or second speech recognition result information, it may delete the first speech recognition result information and second speech recognition result information from the memory 105.

While the terminal 100 includes the determination unit 14 in the present embodiment, other configurations may be employed. For example, the server 200 may include a determination unit.

Figure 7:
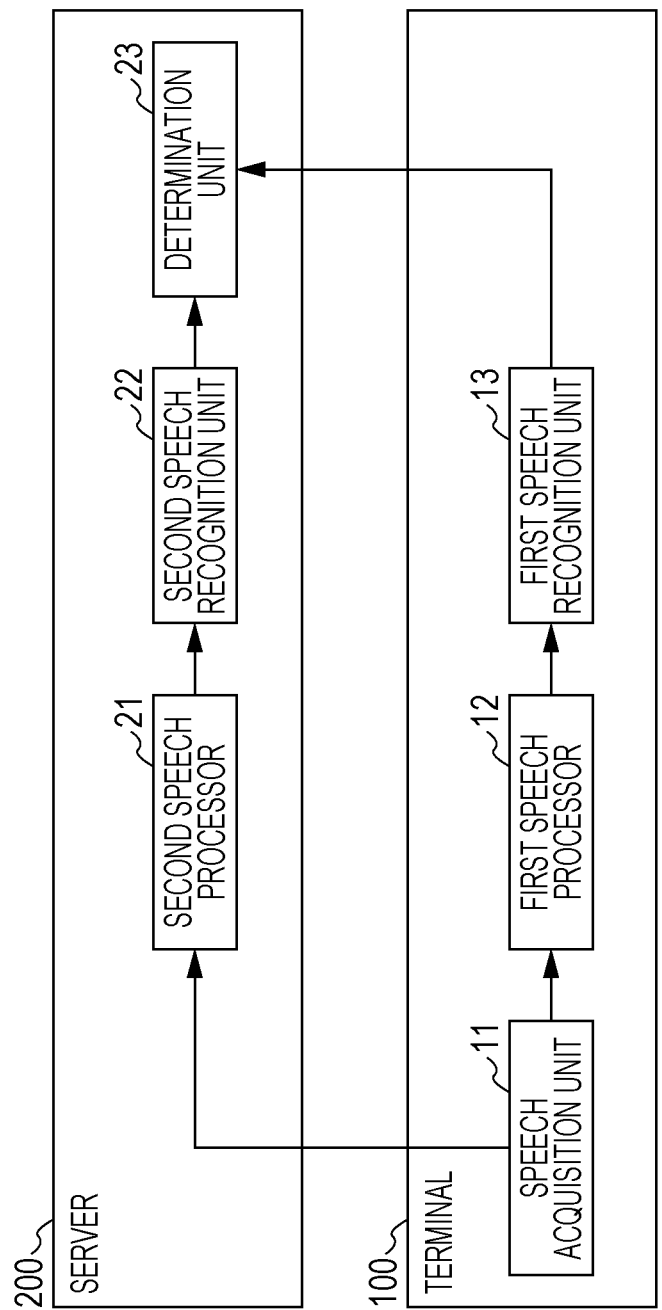
FIG. 7 is a diagram showing the functional configuration of a speech recognition system according to a modification of the first embodiment of the present disclosure.

FIG. 7 is a diagram showing the functional configuration of a speech recognition system according to a modification of the first embodiment of the present disclosure. As shown in FIG. 7, a terminal 100 includes a speech acquisition unit 11, a first speech processor 12, and a first speech recognition unit 13. A server 200 includes a second speech processor 21, a second speech recognition unit 22, and a determination unit 23.

A communication unit 101 of the terminal 100 transmits first speech recognition result information and the first likelihood outputted by the first speech recognition unit 13 to the server 200. A communication unit 201 of the server 200 receives the first speech recognition result information and the first likelihood transmitted by the terminal 100 and outputs it to the determination unit 23.

The second speech recognition unit 22 performs speech recognition on third speech information outputted by the second speech processor 21 and outputs the speech recognition result as second speech recognition result information to the determination unit 23. Also, second speech recognition unit 22 outputs the second likelihood to determination unit 23.

The determination unit 23 makes a selection as to which of the first speech recognition result information received by the communication unit 201 and the second speech recognition result information outputted by the second speech recognition unit 22 should be outputted. The process performed by the determination unit 23 is the same as that performed by the determination unit 14 and therefore will not be described.

The communication unit 201 of the server 200 transmits the selection result outputted by the determination unit 23 to the terminal 100. The selection result includes one of the first speech recognition result information and second speech recognition result information, or information indicating that speech recognition has failed. The communication unit 101 of the terminal 100 receives the selection result transmitted by the server 200.

As seen above, the determination unit may be included in any of the terminal 100 and server 200. If the determination unit is included in the server 200, the amount of computation performed by the terminal 100 can be reduced. In contrast, if the determination unit is included in the terminal 100, there is no need to receive the selection result through the network and therefore the processing time can be reduced.

The method by which the first speech processor 12 removes noise contained in the first speech information and the method by which the second speech processor 21 removes noise contained in the first speech information have been referred to as the first removal method and second removal method, respectively, in the above description. However, the first removal method and second removal method are only the names of the methods by which the first speech processor 12 and second speech processor 21 remove noise contained in the first speech information. Accordingly, the method by which the first speech processor 12 removes noise contained in the first speech information may be referred to as a second removal method, and the method by which the second speech processor 21 removes noise contained in the first speech information may be referred to as a first removal method.

Second Embodiment

Next, a speech recognition system according to a second embodiment will be described. The overall configuration of the speech recognition system according to the second embodiment is the same as that shown in FIG. 1 and therefore will not be described.

Figure 8:
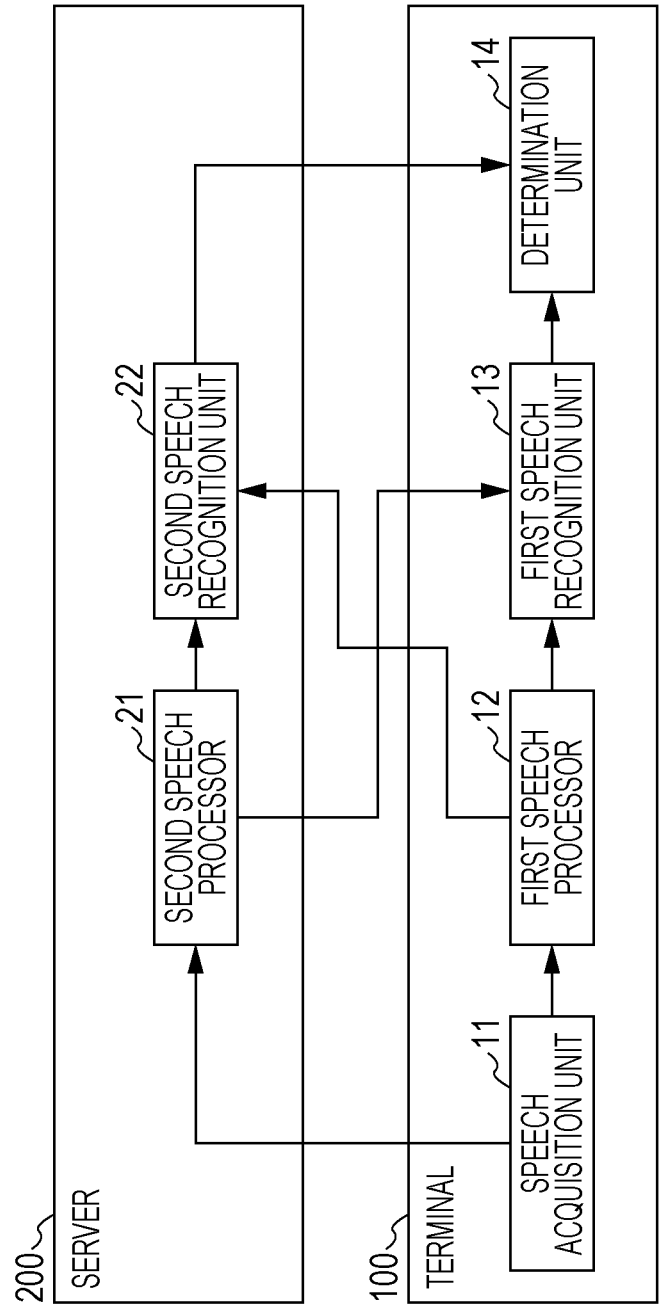
FIG. 8 is a diagram showing the functional configuration of a speech recognition system according to a second embodiment of the present disclosure.

FIG. 8 is a diagram showing the functional configuration of the speech recognition system according to the second embodiment of the present disclosure. As shown in FIG. 8, the speech recognition system includes a terminal 100 and a server 200. The terminal 100 includes a speech acquisition unit 11, a first speech processor 12, a first speech recognition unit 13, and a determination unit 14. The server 200 includes a second speech processor 21 and a second speech recognition unit 22.

A communication unit 201 of the server 200 transmits third speech information outputted by the second speech processor 21 to the terminal 100. A communication unit 101 of the terminal 100 receives the third speech information from the server 200 and outputs the received third speech information to the first speech recognition unit 13. The first speech recognition unit 13 performs speech recognition on the third speech information received by the communication unit 101 and outputs the speech recognition result as fourth speech recognition result information to the determination unit 14.

In this case, the speech recognition result includes the speech recognition result of the third speech information. The first speech recognition unit 13 calculates a fourth likelihood indicating the likelihood of this recognition result information and outputs the calculated fourth likelihood to the determination unit 14.

The first speech recognition unit 13 performs this process by using the third speech information in place of the second speech information in the speech recognition and likelihood calculation process by the first speech recognition unit 13 described in the first embodiment. Accordingly, the speech recognition of the third speech information and the calculation of the fourth likelihood by the first speech recognition unit 13 will not be described in detail.

While, in the present embodiment, the first speech recognition unit 22 outputs the fourth speech recognition result information and fourth likelihood to the determination unit 14, other configurations may be employed. The first speech recognition unit 13 calculates the fourth likelihood when it performs speech recognition on the third speech information. For example, the first speech recognition unit 13 may output fourth speech recognition result information including the speech recognition result of the third speech information and the fourth likelihood to the determination unit 14.

In this case, the determination unit 14 retrieves the speech recognition result of the third speech information and the fourth likelihood from the fourth speech recognition result information as necessary and performs processing.

The communication unit 101 transmits second speech information outputted by the first speech processor 12 to the server 200. The communication unit 201 of the server 200 receives the second speech information transmitted by the terminal 100 and outputs it to the second speech recognition unit 22.

The second speech recognition unit 22 performs speech recognition on the second speech information received by the communication unit 201 and outputs the speech recognition result as third speech recognition result information to the communication unit 201.

In this case, the speech recognition result includes the speech recognition result of the second speech information. The second speech recognition unit 22 calculates a third likelihood indicating the likelihood of this speech recognition result information and outputs the calculated third likelihood to the communication unit 201.

The second speech recognition unit 22 performs this process by using the second speech information in place of the third speech information in the speech recognition and likelihood calculation process by the second speech recognition unit 22 described in the first embodiment. Accordingly, the speech recognition of the second speech information and the calculation of the third likelihood by the second speech recognition unit 22 will not be described in detail.

While, in the present embodiment, the second speech recognition unit 22 outputs the third speech recognition result information and third likelihood to the communication unit 201, other configurations may be employed. The second speech recognition unit 22 calculates the third likelihood when it performs speech recognition on the second speech information. For example, the second speech recognition unit 22 may output third speech recognition result information including the speech recognition result of the second speech information and the third likelihood to the communication unit 201.

In this case, one of the communication unit 201, communication unit 101, and determination unit 14 retrieves the speech recognition result of the second speech information or the third likelihood from the third speech recognition result information as necessary and performs processing.

The communication unit 201 transmits the third speech recognition result information and the third likelihood outputted by the second speech recognition unit 22 to the terminal 100. The communication unit 101 receives the third speech recognition result information, which is the speech recognition result of the second speech information, from the server 200 and outputs it to the determination unit 14.

The determination unit 14 makes a selection as to which of first speech recognition result information outputted by the first speech recognition unit 13, the second speech recognition result information received by the communication unit 101, the third speech recognition result information received by the communication unit 101, and the fourth speech recognition result information outputted by the first speech recognition unit 13 should be outputted.

The first speech recognition unit 13 calculates a first likelihood indicating the likelihood of the first speech recognition result information and outputs the calculated first likelihood to the determination unit 14.

The communication unit 101 receives the second likelihood transmitted by the server 200 and indicating the likelihood of the second speech recognition result information and outputs the received second likelihood to the determination unit 14. The communication unit 101 also receives the third likelihood transmitted by the server 200 and indicating the likelihood of the third speech recognition result information and outputs the received third likelihood to the determination unit 14.

The first speech recognition unit 13 calculates a fourth likelihood indicating the likelihood of the fourth speech recognition result information and outputs the calculated fourth likelihood to the determination unit 14.

The determination unit 14 makes a selection as to which of the first speech recognition result information, second speech recognition result information, third speech recognition result information, and fourth speech recognition result information should be outputted, on the basis of at least one of the first likelihood, second likelihood, third likelihood, and fourth likelihood.

Figure 9:
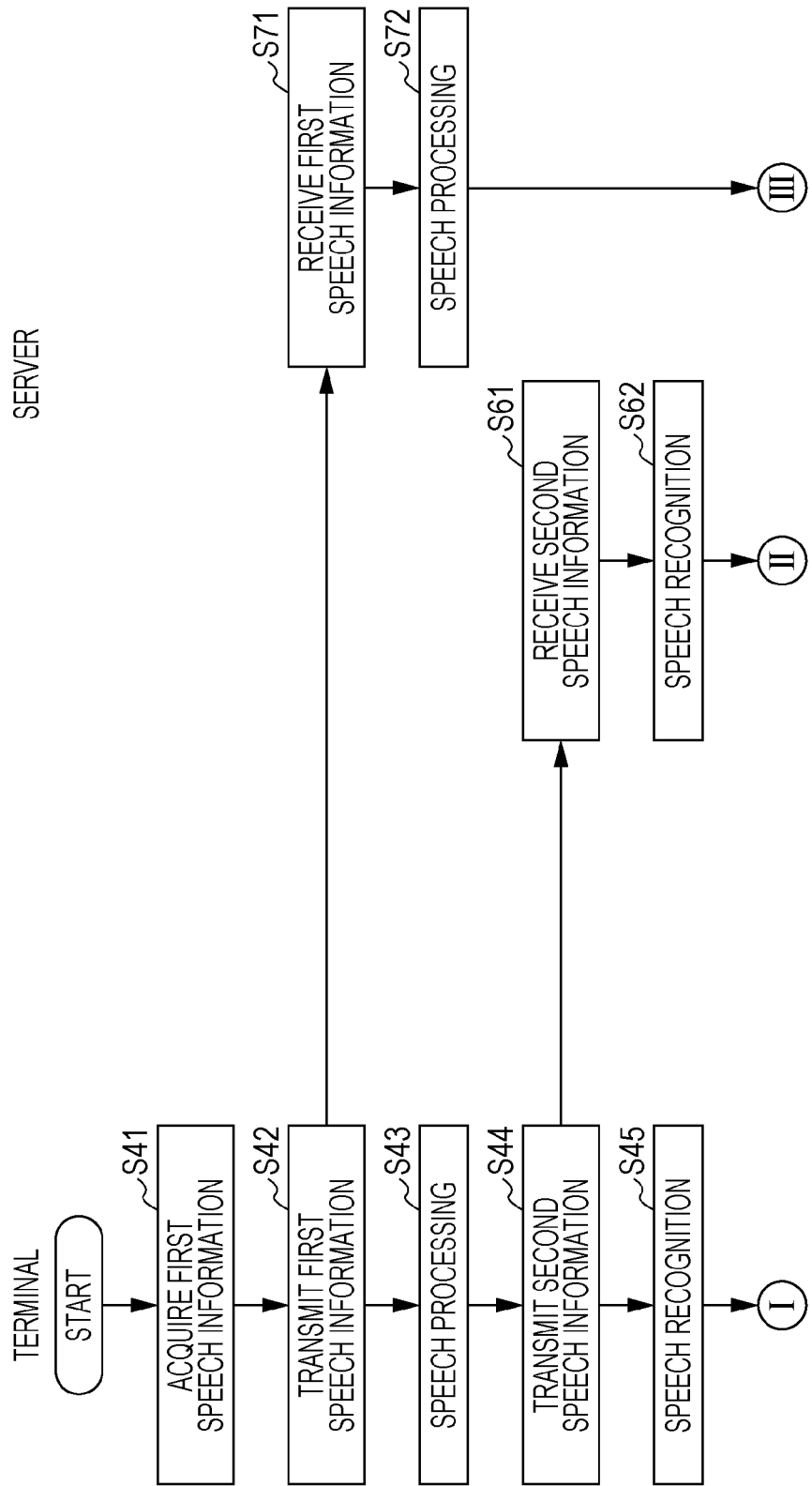
FIG. 9 is a first flowchart showing an example of the operation of the speech recognition system according to the second embodiment of the present disclosure.
Figure 10:
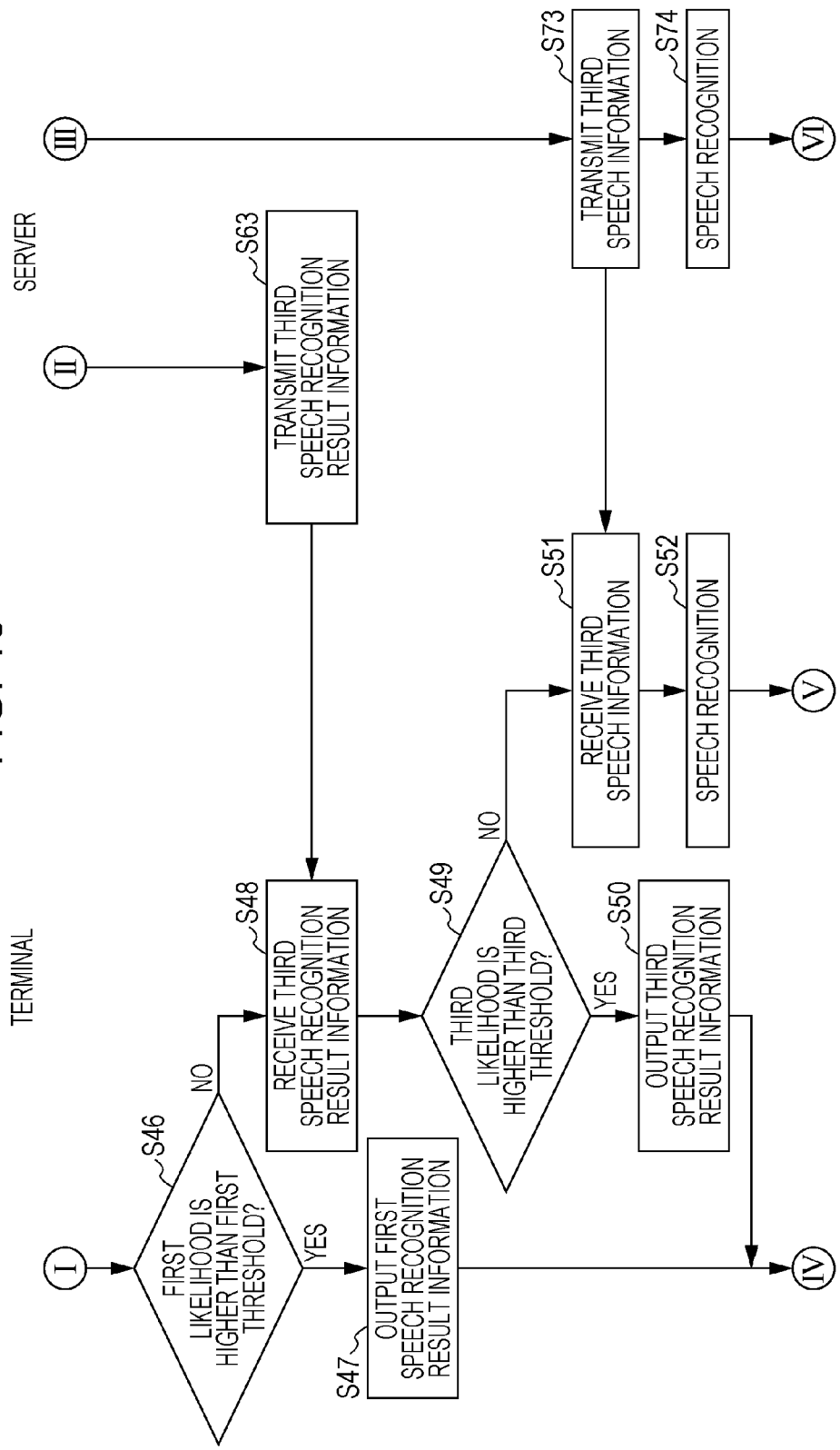
FIG. 10 is a second flowchart showing an example of the operation of the speech recognition system according to the second embodiment of the present disclosure.
Figure 11:
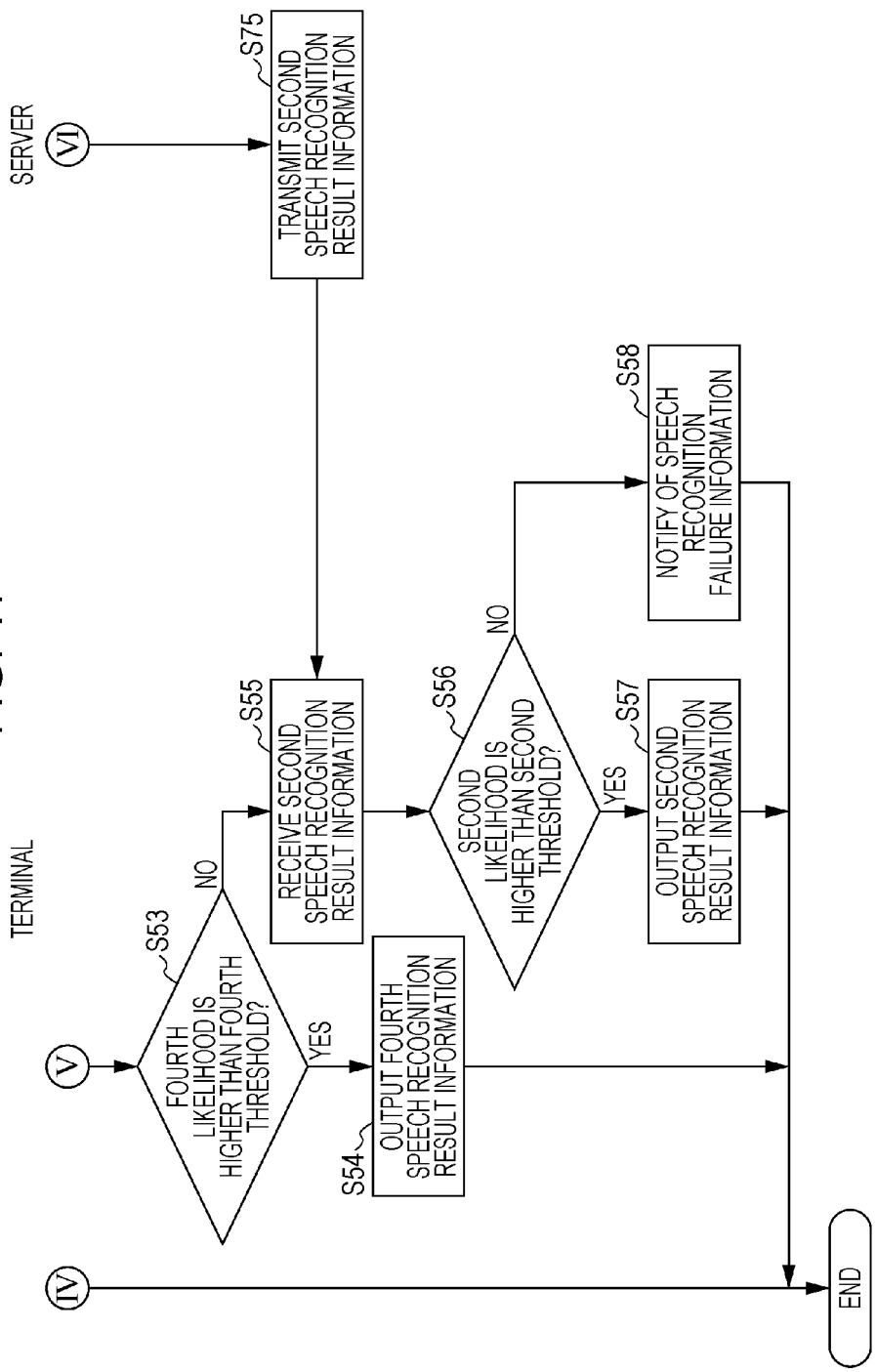
FIG. 11 is a third flowchart showing an example of the operation of the speech recognition system according to the second embodiment of the present disclosure.

FIG. 9 is a first flowchart showing an example of the operation of the speech recognition system according to the second embodiment of the present disclosure. FIG. 10 is a second flowchart showing an example of the operation of the speech recognition system according to the second embodiment of the present disclosure. FIG. 11 is a third flowchart showing an example of the operation of the speech recognition system according to the second embodiment of the present disclosure.

In step S41, the speech acquisition unit 11 of the terminal 100 acquires the first speech information.

In step S42, the communication unit 101 transmits the first speech information acquired by the speech acquisition unit 11 to the server 200.

In step S43, the first speech processor 12 removes noise contained in the first speech information acquired by the speech acquisition unit 11 and outputs the noise-removed speech information as the second speech information.

In step S44, the communication unit 101 transmits the second speech information, which is the speech information noise-removed by the first speech processor 12, to the server 200.

In step S45, the first speech recognition unit 13 performs speech recognition on the second speech information outputted by the first speech processor 12 and outputs the speech recognition result as first speech recognition result information to the determination unit 14. Also, the first speech recognition unit 13 calculates a first likelihood indicating the likelihood of the first speech recognition result information and outputs the calculated first likelihood to the determination unit 14.

In step S46, the determination unit 14 determines whether the first likelihood indicating the likelihood of the first speech recognition result information is higher than the first threshold. Note that the first threshold is a threshold with which the determination unit 14 can determine that the first speech recognition result information is an accurate recognition result. If the determination unit 14 determines that the first likelihood is higher than the first threshold (YES in step S46), it outputs the first speech recognition result information in step S47.

In contrast, if the determination unit 14 determines that the first likelihood is lower than or equal to the first threshold (NO in step S46), the process proceeds to step S48.

The server 200 performs steps S61 to S63 while the terminal 100 performs steps S44 to S46.

In step S61, the communication unit 201 of the server 200 receives the second speech information transmitted by the terminal 100.

In step S62, the second speech recognition unit 22 performs speech recognition on the second speech information received by the communication unit 201 and outputs the speech recognition result as the third speech recognition result information the communication unit 201. Also, the second speech recognition unit 22 calculates a third likelihood indicating the likelihood of the third speech recognition result information and outputs the calculated third likelihood to the communication unit 201.

In step S63 the communication unit 201 transmits the third speech recognition result information the third likelihood outputted by the second speech recognition unit 22 to the terminal 100.

In step S48, the communication unit 101 of the terminal 100 receives the third speech recognition result information and the third likelihood transmitted by the server 200. Also, the communication unit 101 outputs the third speech recognition result information and the third likelihood to the determination unit 14.

In step S49, the determination unit 14 determines whether the third likelihood indicating the likelihood of the third speech recognition result information is higher than the third threshold. Note that the third threshold is a threshold with which the determination unit 14 can determine that the third speech recognition result information is an accurate recognition result. If the determination unit 14 determines that the third likelihood is higher than the third threshold (YES in step S49), it outputs the third speech recognition result information in step S50.

In contrast, if the determination unit 14 determines that the third likelihood is lower than or equal to the third threshold (NO in step S49), the process proceeds to step S51.

The server 200 performs steps S71 to S73 while the terminal 100 performs steps S42 to S49.

In step S71, the communication unit 201 of the server 200 receives the first speech information transmitted by the terminal 100.

In step S72, the second speech processor 21 removes noise contained in the first speech information received by the communication unit 201 and outputs the noise-removed speech information as the third speech information.

In step S73, the communication unit 201 transmits the third speech information outputted by the second speech processor 21 to the terminal 100.

In step S51, the communication unit 101 of the terminal 100 receives the third speech information transmitted by the server 200.

In step S52, the first speech recognition unit 13 performs speech recognition on the third speech information received by the communication unit 101 and outputs the speech recognition result as the fourth speech recognition result information to the determination unit 14. Also, the first speech recognition unit 13 calculates a fourth likelihood indicating the likelihood of the fourth speech recognition result information and outputs the calculated fourth likelihood to the determination unit 14.

In step S53, the determination unit 14 determines whether the fourth likelihood indicating the likelihood of the fourth speech recognition result information is higher than the fourth threshold. Note that the fourth threshold is a threshold with which the determination unit 14 can determine that the fourth speech recognition result information is an accurate recognition result. If the determination unit 14 determines that the fourth likelihood is higher than the fourth threshold (YES in step S53), it outputs the fourth speech recognition result information in step S54.

In contrast, if the determination unit 14 determines that the fourth likelihood is lower than or equal to the fourth threshold (NO in step S53), the process proceeds to step S55.

The server 200 performs steps S74 and S75 while the terminal 100 performs steps S52 to S53.

In step S74, the second speech recognition unit 22 performs speech recognition on the third speech information outputted by the second speech processor 21 and outputs the speech recognition result as the second speech recognition result information to the communication unit 201. Also, the second speech recognition unit 22 calculates a second likelihood indicating the likelihood of the second speech recognition result information and outputs the calculated second likelihood to the communication unit 201.

In step S75, the communication unit 201 transmits the second speech recognition result information and the second likelihood outputted by the second speech recognition unit 22 to the terminal 100.

In step S55, the communication unit 101 of the terminal 100 receives the second speech recognition result information and the second likelihood transmitted by the server 200. Also, the communication unit 101 outputs the second speech recognition result information and the second likelihood to the determination unit 14.

In step S56, the determination unit 14 determines whether the second likelihood indicating the likelihood of the second speech recognition result information is higher than the second threshold. Note that the second threshold is a threshold with which the determination unit 14 can determine that the second speech recognition result information is an accurate recognition result. If the determination unit 14 determines that the second likelihood is higher than the second threshold (YES in step S56), it outputs the second speech recognition result information in step S57.

In contrast, if the determination unit 14 determines that the second likelihood is lower than or equal to the second threshold (NO in step S56), the display 106 notifies the user of speech recognition failure information indicating that speech recognition has failed, in step S58. Note that the first to fourth thresholds are previously stored in the memory 105 of the terminal 100.

Note that the first to fourth thresholds are previously stored, for example, in the memory 105 of the terminal 100.

While, in the present embodiment, the first speech recognition unit 13 outputs the first speech recognition result information, first likelihood, fourth speech recognition result information, and fourth likelihood to the determination unit 14, other configurations may be employed.

The first speech recognition unit 13 calculates the first likelihood when it performs speech recognition on the second speech information. For example, the first speech recognition unit 13 may output first speech recognition result information including the speech recognition result of the second speech information and the first likelihood to the determination unit 14.

In this case, the determination unit 14 retrieves the speech recognition result of the second speech information and first likelihood from the first speech recognition result information as necessary and performs processing.

The first speech recognition unit 13 calculates the fourth likelihood when it performs speech recognition on the third speech information. For example, the first speech recognition unit 13 may output fourth speech recognition result information including the speech recognition result of the third speech information and the fourth likelihood to the determination unit 14.

In this case, the determination unit 14 retrieves the speech recognition result of the third speech information and the fourth likelihood from the fourth speech recognition result information as necessary and performs processing.

While, in the present embodiment, the second speech recognition unit 22 outputs the second speech recognition result information, second likelihood, third speech recognition result information, and third likelihood to the communication unit 201, other configurations may be employed.

The second speech recognition unit 22 calculates the second likelihood when it performs speech recognition on the third speech information. For example, the second speech recognition unit 22 may output second speech recognition result information including the speech recognition result of the third speech information and the second likelihood to the communication unit 201.

In this case, one of the communication unit 201, communication unit 101, and determination unit 14 retrieves the speech recognition result of the third speech information or the second likelihood from the second speech recognition result information as necessary and performs processing.

The second speech recognition unit 22 calculates the third likelihood when it performs speech recognition on the second speech information. For example, the second speech recognition unit 22 may output third speech recognition result information including the speech recognition result of the second speech information and the third likelihood to the communication unit 201.

In this case, one of the communication unit 201, communication unit 101, and determination unit 14 retrieves the speech recognition result of the second speech information or the third likelihood from the third speech recognition result information as necessary and performs processing.

While, in the present embodiment, the first speech recognition unit 13 outputs the first speech recognition result information, first likelihood, fourth speech recognition result information, and fourth likelihood to the determination unit 14 and the communication unit 101 outputs the second speech recognition result information, second likelihood, third speech recognition result information, and third likelihood transmitted by the server 200 to the determination unit 14, other configurations may be employed.

For example, when the determination unit 14 receives the first likelihood, it may determine whether it should output the first speech recognition result information, in accordance with the result of a comparison with a previously held first threshold.

When the determination unit 14 receives the second likelihood, it may determine whether it should output the second speech recognition result information, in accordance with the result of a comparison with a previously held second threshold.

When the determination unit 14 receives the third likelihood, it may determine whether it should output the third speech recognition result information, in accordance with the result of a comparison with a previously held third threshold.

When the determination unit 14 receives the fourth likelihood, it may determine whether it should output the fourth speech recognition result information, in accordance with the result of a comparison with a previously held fourth threshold.

For example, the first speech recognition unit 13 may store the first speech recognition result information and fourth speech recognition result information in the memory 105 of the terminal 100 rather than outputting them to the determination unit 14. In this case, the communication unit 101 outputs the first likelihood and fourth likelihood to the determination unit 14.

For example, the communication unit 101 may store the second speech recognition result information and third speech recognition result information in the memory 105 of the terminal 100 rather than outputting them to the determination unit 14. In this case, the communication unit 101 outputs the second likelihood and third likelihood to the determination unit 14.

For example, the determination unit 14 may retrieve one of the first to fourth speech recognition result information that it has determined that it should output, from the memory 105 and may output it.

If the determination unit 14 determines that it should not output any of the first to fourth speech recognition result information, it may delete the first to fourth speech recognition result information from the memory 105.

While, in the second embodiment, the transmission of the third speech recognition result information in step S63 is performed earlier than the transmission of the third speech information in step S73, the transmission of the third speech information may be performed earlier than the transmission of the third speech recognition result information.

Hereafter, there will be described a modification of the second embodiment in which the transmission of the third speech information is performed earlier than the transmission of the third speech recognition result information.

Figure 12:
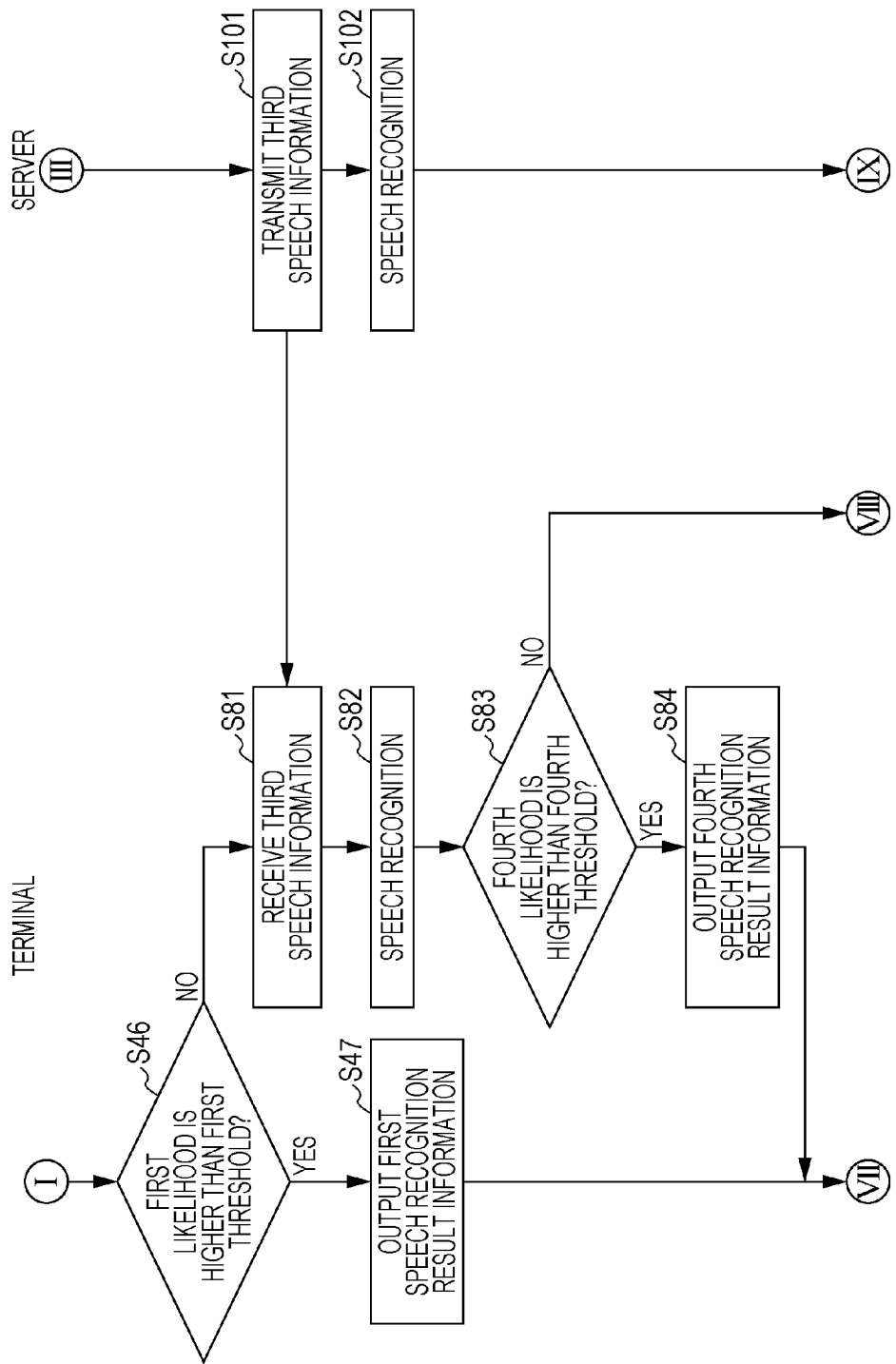
FIG. 12 is a first flowchart showing an example of the operation of the speech recognition system according to a modification of the second embodiment of the present disclosure.
Figure 13:
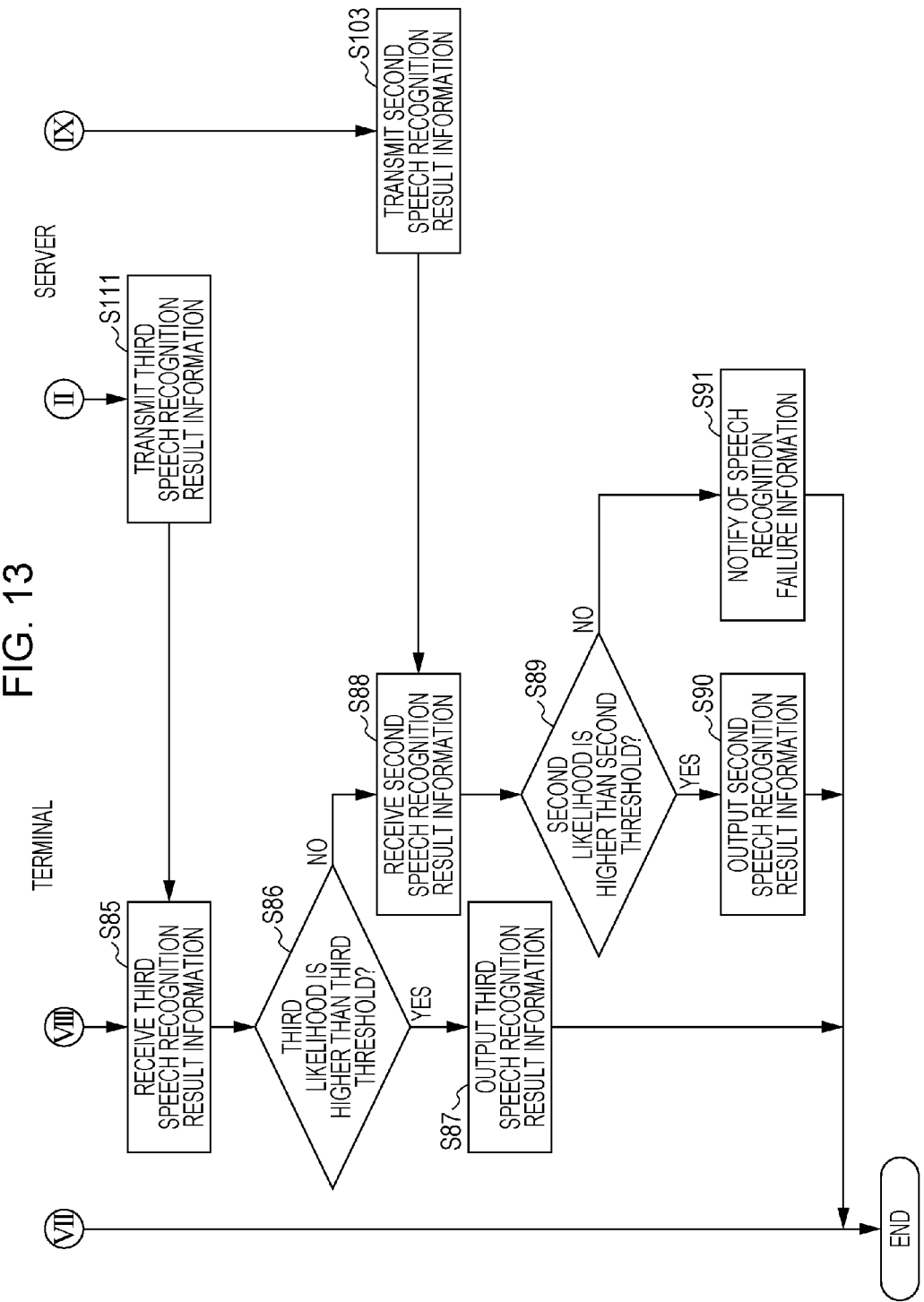
FIG. 13 is a second flowchart showing an example of the operation of the speech recognition system according to the modification of the second embodiment of the present disclosure.

FIG. 12 is a first flowchart showing an example of the operation of the speech recognition system according to the modification of the second embodiment of the present disclosure. FIG. 13 is a second flowchart showing an example of the operation of the speech recognition system according to the modification of the second embodiment of the present disclosure. The steps before step S46 in FIG. 12 are the same as steps S41 to S45 in FIG. 9; the steps before step S101 in FIG. 12 are the same as steps S71 and S72 in FIG. 9; and the steps before step S111 in FIG. 13 are the same as steps S61 and S62 in FIG. 9.

In step S101, the communication unit 201 transmits the third speech information outputted by the second speech processor 21 to the terminal 100.

In step S81, the communication unit 101 of the terminal 100 receives the third speech information transmitted by the server 200.

In step S82, the first speech recognition unit 13 performs speech recognition on the third speech information received by the communication unit 101 and outputs the speech recognition result as the fourth speech recognition result information to the determination unit 14. Also, the first speech recognition unit 13 calculates a fourth likelihood indicating the likelihood of the fourth speech recognition result information and outputs the calculated fourth likelihood to the determination unit 14.

In step S83, the determination unit 14 determines whether the fourth likelihood indicating the likelihood of the fourth speech recognition result information is higher than the fourth threshold. Note that the fourth threshold is a threshold with which the determination unit 14 can determine that the fourth speech recognition result information is an accurate recognition result. If the determination unit 14 determines that the fourth likelihood is higher than the fourth threshold (YES in step S83), it outputs the fourth speech recognition result information in step S84.

In contrast, the determination unit 14 determines that the fourth likelihood is lower than or equal to the fourth threshold (NO in step S83), the process proceeds to step S85.

The server 200 performs steps S61 to S111 while the terminal 100 performs steps S44 to S83.

In step S111, the communication unit 201 transmits the third speech recognition result information and the third likelihood outputted by the second speech recognition unit 22 to the terminal 100.

In step S85, the communication unit 101 of the terminal 100 receives the third speech recognition result information and the third likelihood transmitted by the server 200. Also, the communication unit 101 transmits the third speech recognition result information and the third likelihood to the determination unit 14.

In step S86, the determination unit 14 determines whether the third likelihood indicating the likelihood of the third speech recognition result information is higher than the third threshold. Note that the third threshold is a threshold with which the determination unit 14 can determine that the third speech recognition result information is an accurate recognition result. If the determination unit 14 determines that the third likelihood is higher than the third threshold (YES in step S86), it outputs the third speech recognition result information in step S87.

In contrast, if the determination unit 14 determines that the third likelihood is lower than or equal to the third threshold (NO in step S86), the process proceeds to step S88.

The server 200 performs steps S102 and S103 while the terminal 100 performs steps S82 to S86.

In step S102, the second speech recognition unit 22 performs speech recognition on the third speech information outputted by the second speech processor 21 and outputs the speech recognition result as the second speech recognition result information to the communication unit 201. Also, the second speech recognition unit 22 calculates a second likelihood indicating the likelihood of the second speech recognition result information and outputs the calculated second likelihood to the communication unit 201.

In step S103, the communication unit 201 transmits the second speech recognition result information and the second likelihood outputted by the second speech recognition unit 22 to the terminal 100.

In step S88, the communication unit 101 of the terminal 100 receives the second speech recognition result information and the second likelihood transmitted by the server 200. Also, the communication unit 101 outputs the second speech recognition result information and the second likelihood to the determination unit 14.

In step S89, the determination unit 14 determines whether the second likelihood indicating the likelihood of the second speech recognition result information is higher than the second threshold. Note that the second threshold is a threshold with which the determination unit 14 can determine that the second speech recognition result information is an accurate recognition result. If the determination unit 14 determines that the second likelihood is higher than the second threshold (YES in step S89), it outputs the second speech recognition result information in step S90.

In contrast, if the determination unit 14 determines that the second likelihood is lower than or equal to the second threshold (NO in step S89), the display 106 notifies the user of speech recognition failure information indicating that speech recognition has failed, in step S91.

Third Embodiment

Next, a speech recognition system according to a third embodiment will be described. The overall configuration of the speech recognition system according to the third embodiment is the same as that shown in FIG. 1 and therefore will not be described.

Figure 14:
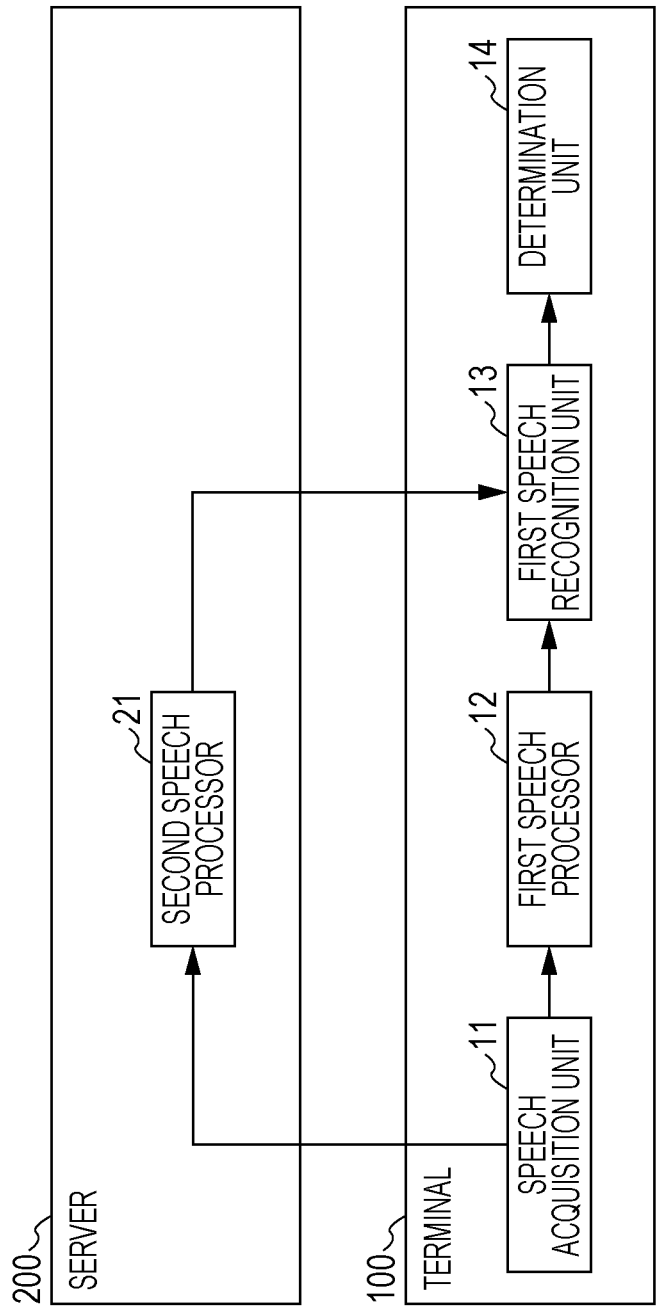
FIG. 14 is a diagram showing the functional configuration of a speech recognition system according to a third embodiment of the present disclosure.

FIG. 14 is a diagram showing the functional configuration of the speech recognition system according to the third embodiment of the present disclosure. As shown in FIG. 14, the speech recognition system includes a terminal 100 and a server 200. The terminal 100 includes a speech acquisition unit 11, a first speech processor 12, a first speech recognition unit 13, and a determination unit 14. The server 200 includes a second speech processor 21.

The difference between the speech recognition system according to the first embodiment and the speech recognition system according to the third embodiment is whether the server 200 includes a second speech recognition unit 22.

The second speech processor 21 removes noise contained in first speech information received by a communication unit 201 and outputs the noise-removed speech information as third speech information.

The communication unit 201 of the server 200 transmits the third speech information outputted by the second speech processor 21 to the terminal 100.

The first speech recognition unit 13 performs speech recognition on second speech information outputted by the first speech processor 12 and outputs the speech recognition result as first speech recognition result information to the determination unit 14. Also, the first speech recognition unit 13 calculates a first likelihood indicating the likelihood of the first speech recognition result information and outputs the calculated first likelihood to the determination unit 14. The first speech recognition unit 13 also performs speech recognition on the third speech information received by the communication unit 101 and outputs the speech recognition result as fourth speech recognition result information to the determination unit 14. Also, the first speech recognition unit 13 calculates a fourth likelihood indicating the likelihood of the fourth speech recognition result information and outputs the calculated fourth likelihood to the determination unit 14.

The determination unit 14 makes a selection as to which of the first speech recognition result information outputted by the first speech recognition unit 13 and the fourth speech recognition result information outputted by the first speech recognition unit 13 should be outputted. The process performed by the determination unit 14 is the same as those in the other embodiments and therefore will not be described.

Fourth Embodiment

Next, a speech recognition system according to a fourth embodiment will be described. The overall configuration of the speech recognition system according to the fourth embodiment is the same as that shown in FIG. 1 and therefore will not be described.

Figure 15:
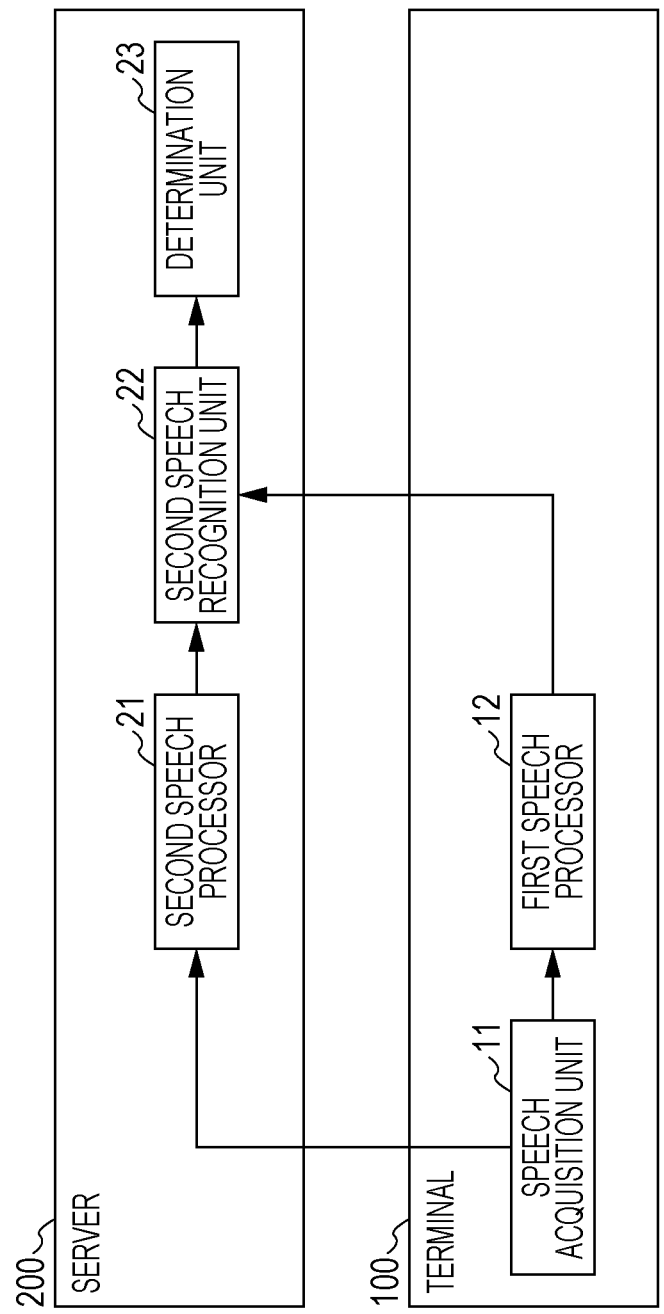
FIG. 15 is a diagram showing the functional configuration of a speech recognition system according to a fourth embodiment of the present disclosure.

FIG. 15 is a diagram showing the functional configuration of the speech recognition system according to the fourth embodiment of the present disclosure. As shown in FIG. 15, the speech recognition system includes a terminal 100 and a server 200. The terminal 100 includes a speech acquisition unit 11 and a first speech processor 12. The server 200 includes a second speech processor 21, a second speech recognition unit 22, and a determination unit 23.

The difference between the speech recognition system according to the modification of the first embodiment (FIG. 7) and the speech recognition system according to the fourth embodiment is whether the terminal 100 includes a first speech recognition unit 13.

A communication unit 101 transmits second speech information outputted by the first speech processor 12 to the server 200. A communication unit 201 of the server 200 receives the second speech information transmitted by the terminal 100 and outputs it to the second speech recognition unit 22. The second speech recognition unit 22 performs speech recognition on the second speech information received by the communication unit 201 and outputs the speech recognition result as third speech recognition result information to the determination unit 23.

The second speech recognition unit 22 also performs speech recognition on third speech information outputted by the second speech processor 21 and outputs the speech recognition result as second speech recognition result information to the determination unit 23.

The determination unit 23 makes a selection as to which of the third speech recognition result information outputted by the second speech recognition unit 22 and the second speech recognition result information outputted by the second speech recognition unit 22 should be outputted. The process performed by the determination unit 23 is the same as those in the other embodiments and therefore will not be described.

Fifth Embodiment

Next, a speech recognition system according to a fifth embodiment will be described. The overall configuration of the speech recognition system according to the fifth embodiment is the same as that shown in FIG. 1 and therefore will not be described.

Figure 16:
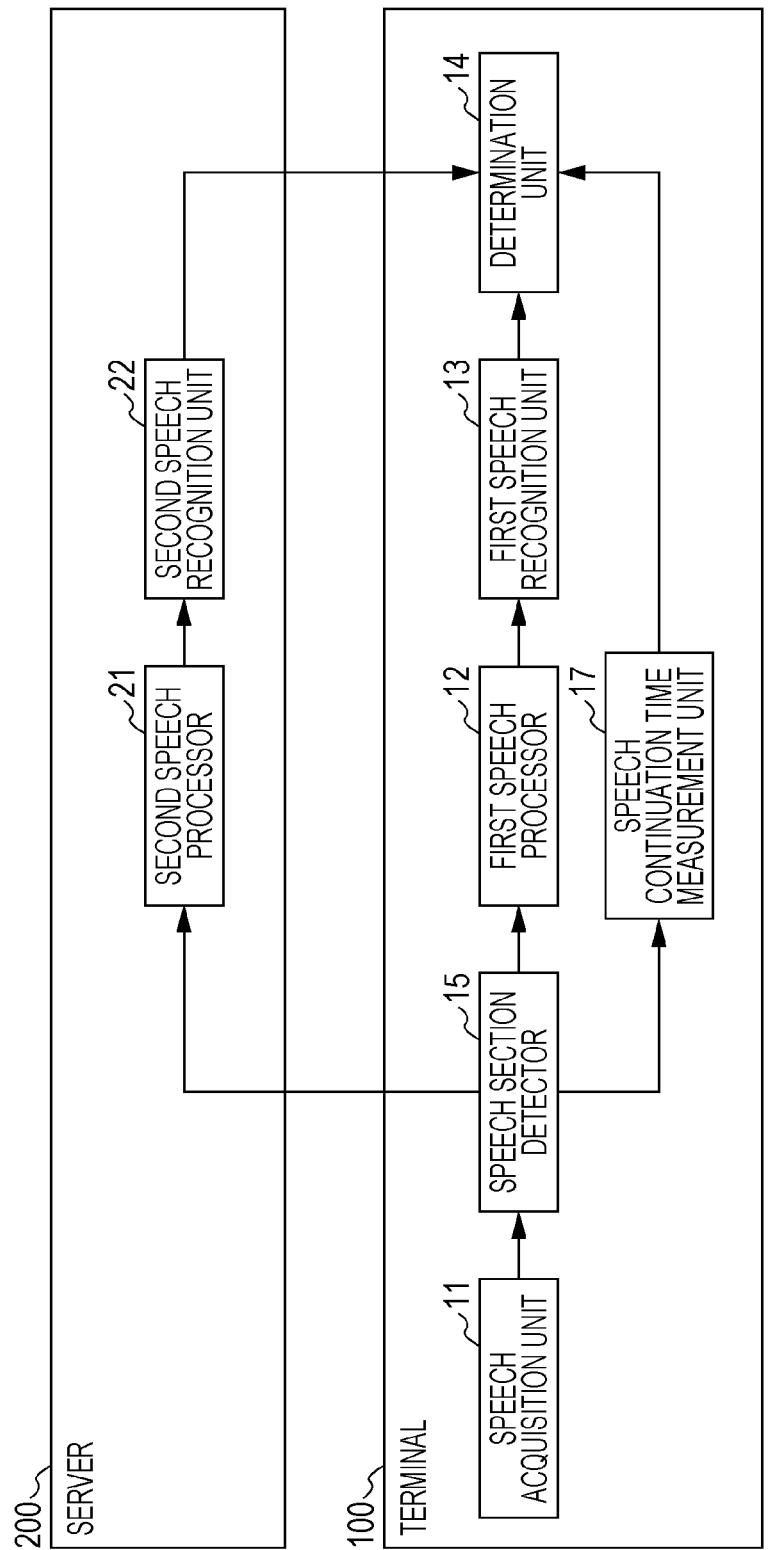
FIG. 16 is a diagram showing the functional configuration of a speech recognition system according to a fifth embodiment of the present disclosure.

FIG. 16 is a diagram showing the functional configuration of the speech recognition system according to the fifth embodiment of the present disclosure. As shown in FIG. 16, the speech recognition system includes a terminal 100 and a server 200. The terminal 100 includes a speech acquisition unit 11, a first speech processor 12, a first speech recognition unit 13, a determination unit 14, a speech section detector 15, and a speech continuation time measurement unit 17. The server 200 includes a second speech processor 21 and a second speech recognition unit 22.

The difference between the speech recognition system according to the first embodiment and the speech recognition system according to the fifth embodiment is whether the terminal 100 includes the speech section detector 15 and the speech continuation time measurement unit 17.

The speech section detector 15 detects the section of a speech uttered by the user in first speech information acquired by the speech acquisition unit 11. The speech section detector 15 detects the speech section using a typical voice activity detection (VAD) technology. For example, the speech section detector 15 detects whether a frame composed of the time series of received speech signals is a speech section, on the basis of the amplitude and the zero crossing count.

For example, the speech section detector 15 may detect a speech section as follows: it calculates the probability that the user may be uttering a speech, using a speech model on the basis of the feature value of the received speech information, calculates the probability that the user is not uttering a speech, using a noise model, and determines, as a speech section, a section in which the probability obtained from the speech model is higher than the probability obtained from the noise model.

If the speech section detector 15 detects a speech section, the speech continuation time measurement unit 17 measures the time from the start to end of the section (frame) which has been determined to contain the speech.

If the speech section detector 15 does not detect any speech section, the first speech processor 12 does not remove noise contained in the first speech information or does not output second speech information, and the communication unit 101 does not transmit the first speech information to the server 200.

In contrast, if the speech section detector 15 detects a speech section, the first speech processor 12 removes noise contained in the first speech information, and the communication unit 101 transmits the first speech information in the speech section to the server 200.

The determination unit 14 makes a selection as to which of the first speech recognition result information outputted by the first speech recognition unit 13 and the second speech recognition result information received by the communication unit 101 should be outputted, using at least information about the length of the speech continuation time.

Specifically, if the speech continuation time detected by the speech continuation time measurement unit 17 is longer than a predetermined length, the determination unit 14 increases the weight by which the second likelihood indicating the likelihood of the second speech recognition result information is multiplied compared to the weight by which the first likelihood indicating the likelihood of the first speech recognition result information is multiplied.

When the speech continuation time is longer than the predetermined length, the possibility that the user may be making a high level of speech instruction including many words is high. In this case, false recognition can be prevented by increasing the weight by which the speech recognition result outputted from the server 200 is multiplied.

Note that in the speech recognition system according to the second embodiment shown in FIG. 8, the terminal 100 may include a speech section detector 15 or may include a speech section detector 15 and a speech continuation time measurement unit 17.

In this case, the determination unit 14 makes a selection as to which of the first speech recognition result information, second speech recognition result information, third speech recognition result information, and fourth speech recognition result information should be outputted, using at least information about the length of the speech continuation time.

Further, if the speech continuation time is longer than the predetermined length, the determination unit 14 increases the weights by which the second likelihood indicating the likelihood of the second speech recognition result information and the third likelihood indicating the likelihood of the third speech recognition result information are multiplied compared to the weights by which the first likelihood indicating the likelihood of the first speech recognition result information and the fourth likelihood indicating the likelihood of the fourth speech recognition result information are multiplied.

Further, if the speech continuation time is longer than the predetermined length, the determination unit 14 increases the weight by which the second likelihood is multiplied compared to the weight by which the third likelihood is multiplied.

While speech section detection is performed on the acquired speech information in the fifth embodiment, speech section detection may be performed on the noise-removed speech information. Hereafter, there will be described a modification of the fifth embodiment in which speech section detection is performed on the noise-removed speech information.

Figure 17:
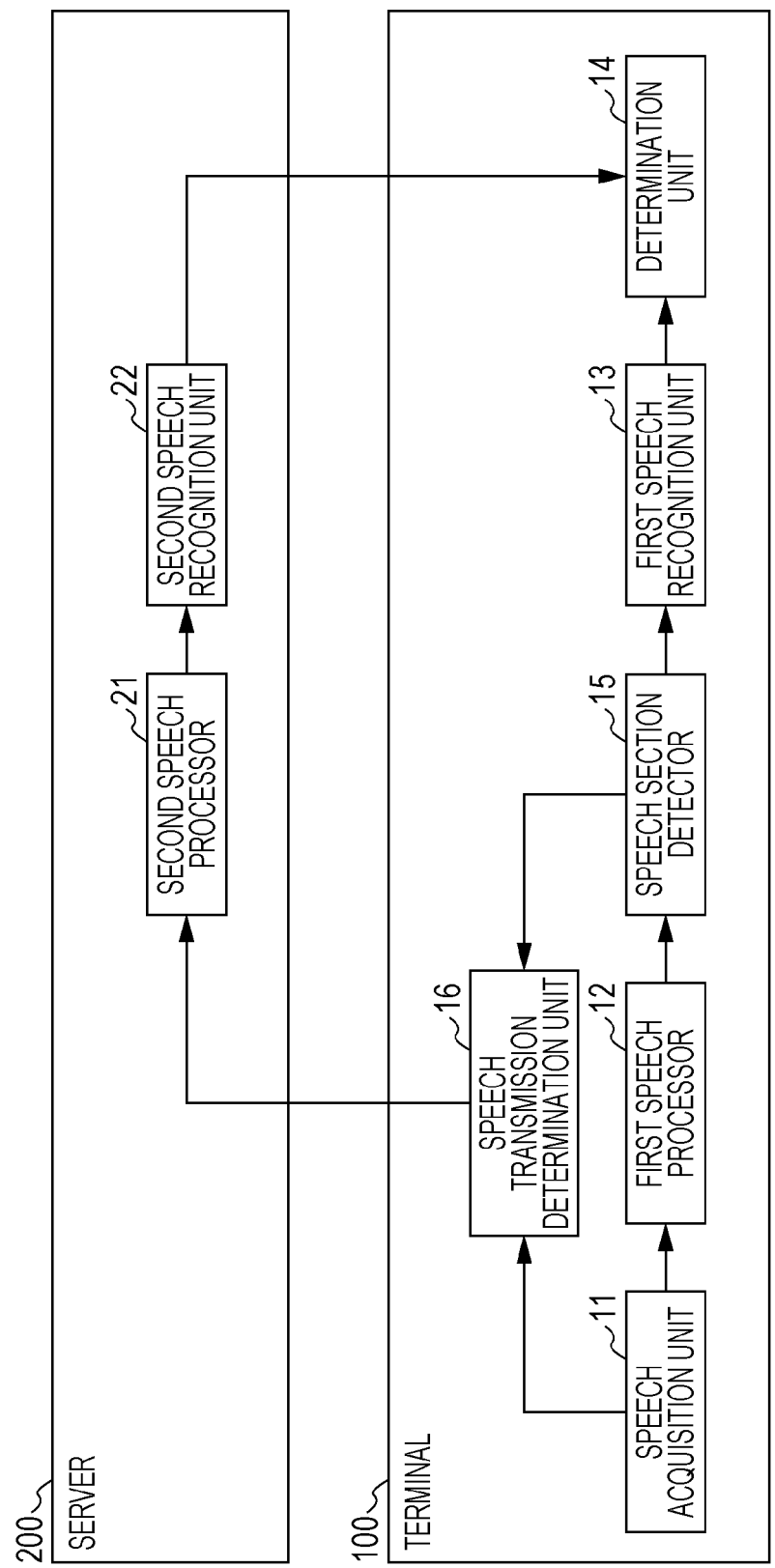
FIG. 17 is a diagram showing the functional configuration of a speech recognition system according to a modification of the fifth embodiment of the present disclosure.

FIG. 17 is a diagram showing the functional configuration of a speech recognition system according to the modification of the fifth embodiment of the present disclosure. As shown in FIG. 17, the terminal 100 includes a speech acquisition unit 11, a first speech processor 12, a first speech recognition unit 13, a determination unit 14, a speech section detector 15, and a speech transmission determination unit 16.

The speech section detector 15 detects the section of a speech uttered by the user in second speech information, which is speech information noise-removed by the first speech processor 12. The speech section detector 15 detects a speech section using a typical voice activity detection technology.

The speech transmission determination unit 16 determines whether first speech information acquired by the speech acquisition unit 11 should be transmitted, on the basis of the result of the speech section detection performed by the speech section detector 15. If a speech section is detected by the speech section detector 15, the speech transmission determination unit 16 determines that the first speech information acquired by the speech acquisition unit 11 should be transmitted; if no speech section is detected by the speech section detector 15, it determines that the first speech information acquired by the speech acquisition unit 11 should not be transmitted. The communication unit 101 transmits the first speech information acquired by the speech acquisition unit 11 on the basis of the determination made by the speech transmission determination unit 16.

By performing speech section detection on the second speech information, which is noise-removed speech information, as described above, a speech section can be detected with higher accuracy.

The speech recognition devices and methods according to the present disclosure are useful as speech recognition devices and methods that can improve the accuracy of speech recognition in a high-noise environment, can speed up speech recognition in a low-noise environment, remove noise contained in speech information, and perform speech recognition on the noise-removed speech information.

What is claimed is:
1. A speech recognition device, comprising:
a speech acquirer that acquires first speech information;
a noise remover that removes noise contained in the first speech information acquired by the speech acquirer using a first removal method and outputs the noise-removed speech information as second speech information;
a speech recognizer that performs speech recognition on the second speech information outputted by the noise remover and outputs a speech recognition result as first speech recognition result information;
a communicator that (i) transmits the first speech information acquired by the speech acquirer to a server, the server removing noise contained in the first speech information using a second removal method that removes a larger amount of noise than an amount of noise removed from the first speech information using the first removal method, the server obtaining, as third speech information, the first speech information in which noise is removed using the second removal method, and the server performing speech recognition on the third speech information, and (ii) receives a speech recognition result as second speech recognition result information from the server, the speech recognition result being a result obtained by performing the speech recognition on third speech information in the server; and
a determiner that makes a selection as to which of the first speech recognition result information outputted by the speech recognizer and the second speech recognition result information received by the communicator should be outputted,
wherein the speech recognizer calculates a first likelihood indicating a likelihood of the first speech recognition result information and outputs the calculated first likelihood to the determiner,
the communicator receives a second likelihood calculated by the server and indicating a likelihood of the second speech recognition result information and outputs the received second likelihood to the determiner, and
the determiner makes a selection as to which of the first speech recognition result information and the second speech recognition result information should be outputted, on the basis of at least one of the first likelihood and the second likelihood.

2. The speech recognition device according to claim 1,
wherein when the first likelihood is higher than a predetermined first threshold, the determiner outputs the first speech recognition result information,
when the first likelihood is lower than or equal to the first threshold and the second likelihood is higher than a predetermined second threshold, the determiner outputs the second speech recognition result information, and
when the first likelihood is lower than or equal to the first threshold and the second likelihood is lower than or equal to the second threshold, the determiner does not output any of the first speech recognition result information and the second speech recognition result information.

3. The speech recognition device according to claim 1, further comprising:
a speech section detector that detects a section of a speech uttered by a user in the first speech information acquired by the speech acquirer,
wherein when the speech section is not detected by the speech section detector, the noise remover does not remove noise contained in the first speech information or output the second speech information, and the communicator does not transmit the first speech information to the server.

4. The speech recognition device according to claim 3, further comprising:
a speech continuation time measurer that when the speech section is detected by the speech section detector, measures a speech continuation time, which is a continuation time of the speech section,
wherein when the speech section is detected by the speech section detector, the noise remover removes noise contained in the first speech information, and the communicator transmits the first speech information in the speech section to the server, and
the determiner makes a selection as to which of the first speech recognition result information outputted by the speech recognizer and the second speech recognition result information received by the communicator should be outputted, on the basis of at least information about a length of the speech continuation time.

5. The speech recognition device according to claim 4,
wherein when the speech continuation time is longer than a predetermined length, the determiner increases a weight by which the second likelihood, indicating the likelihood of the second speech recognition result information, is multiplied, compared to a weight by which the first likelihood, indicating the likelihood of the first speech recognition result information, is multiplied.

6. The speech recognition device according to claim 1,
wherein the communicator receives the third speech information from the server and outputs the received third speech information to the speech recognizer,
the speech recognizer performs speech recognition on the third speech information received by the communicator and outputs a speech recognition result as fourth speech recognition result information,
the communicator transmits the second speech information outputted by the noise remover to the server and receives a speech recognition result as third speech recognition result information from the server, the speech recognition result being obtained by performing speech recognition on the second speech information, and outputs the received third speech recognition result information to the determiner, and
the determiner makes a selection as to which of the first speech recognition result information outputted by the speech recognizer, the second speech recognition result information received by the communicator, the third speech recognition result information received by the communicator, and the fourth speech recognition result information outputted by the speech recognizer should be outputted.

7. The speech recognition device according to claim 6,
wherein the speech recognizer calculates a first likelihood indicating a likelihood of the first speech recognition result information and outputs the calculated first likelihood to the determiner,
the communicator receives a second likelihood calculated by the server and indicating a likelihood of the second speech recognition result information and outputs the received second likelihood to the determinator,
the communicator receives a third likelihood calculated by the server and indicating a likelihood of the third speech recognition result information and outputs the received third likelihood to the determiner,
the speech recognizer calculates a fourth likelihood indicating a likelihood of the fourth speech recognition result information and outputs the calculated fourth likelihood to the determiner, and
the determiner makes a selection as to which of the first speech recognition result information, the second speech recognition result information, the third speech recognition result information, and the fourth speech recognition result information should be outputted, on the basis of at least one of the first likelihood, the second likelihood, the third likelihood, and the fourth likelihood.

8. The speech recognition device according to claim 6, further comprising:
a speech section detector that detects a section of a speech uttered by a user in the first speech information acquired by the speech acquirer,
wherein when the speech section is not detected by the speech section detector, the noise remover does not remove noise contained in the first speech information or output the second speech information, and the communicator does not transmit the first speech information to the server.

9. The speech recognition device according to claim 8, further comprising:
a speech continuation time measurer that when the speech section is detected by the speech section detector, measures a speech continuation time, which is a continuation time of the speech section,
wherein when the speech section is detected by the speech section detector, the noise remover removes noise contained in the first speech information, and the communicator transmits the first speech information in the speech section to the server, and
the determiner makes a selection as to which of the first speech recognition result, the second speech recognition result information, the third speech recognition result information, and the fourth speech recognition result information should be outputted, using at least information about a length of the speech continuation time.

10. The speech recognition device according to claim 9,
wherein when the speech continuation time is longer than a predetermined length, the determiner increases weights by which a second likelihood, indicating a likelihood of the second speech recognition result information, and a third likelihood, indicating a likelihood of the third speech recognition result information, are multiplied, compared to weights, by which a first likelihood, indicating a likelihood of the first speech recognition result information, and a fourth likelihood, indicating a likelihood of the fourth speech recognition result information, are multiplied.

11. The speech recognition device according to claim 10, wherein when the speech continuation time is longer than the predetermined length, the determiner increases the weight by which the second likelihood is multiplied compared to the weight by which the third likelihood is multiplied.

12. A speech recognition device, comprising:
a speech acquirer that acquires first speech information;
a noise remover that removes noise contained in the first speech information acquired by the speech acquirer using a first removal method and outputs the noise-removed speech information as second speech information;
a communicator that (i) transmits the first speech information acquired by the speech acquirer to a server, the server removing noise contained in the first speech information using a second removal method that removes a larger amount of noise than an amount of noise removed from the first speech information using the first removal method, and (ii) receives noise-removed speech information as third speech information from the server, the noise-removed speech information being obtained by removing, in the server, the noise contained in the first speech information using the second removal method;
a speech recognizer that performs speech recognition on the second speech information outputted by the noise remover and outputs a speech recognition result as first speech recognition result information, as well as performs speech recognition on the third speech information received by the communicator and outputs a speech recognition result as second speech recognition result information; and
a determiner that makes a selection as to which of the first speech recognition result information and the second speech recognition result information outputted by the speech recognizer should be outputted,
wherein the speech recognizer calculates a first likelihood indicating a likelihood of the first speech recognition result information and a second likelihood indicating a likelihood of the second speech recognition result information and outputs the calculated first likelihood and the calculated second likelihood to the determiner, and
the determiner makes a selection as to which of the first speech recognition result information and the second speech recognition result information should be outputted, on the basis of at least one of the first likelihood and the second likelihood.

13. A method by which a server performs speech recognition on speech information acquired by a terminal, the server including a communicator, a noise remover, a speech recognizer, and a determiner, the method comprising:
the communicator receiving first speech information acquired by the terminal;
the noise remover removing noise contained in the received first speech information using a first removal method and outputting the noise-removed speech information as second speech information;
the speech recognizer performing speech recognition on the second speech information and outputting a speech recognition result as first speech recognition result information;
the communicator receiving a speech recognition result as second speech recognition result information from the terminal, the terminal obtaining the third speech information by removing noise contained in the first speech information using a second removal method that removes a smaller amount of noise than an amount of noise removed from the first speech information using the first removal method, the terminal performing speech recognition on the third speech information to obtain the speech recognition result as the second speech recognition result information; and
the determiner making a selection as to which of the first speech recognition result information and the second speech recognition result information should be outputted,
wherein the speech recognizer calculates a first likelihood indicating a likelihood of the first speech recognition result information and outputs the calculated first likelihood to the determiner,
the communicator receives a second likelihood calculated by the server and indicating a likelihood of the second speech recognition result information and outputs the received second likelihood to the determiner, and
the determiner makes a selection as to which of the first speech recognition result information and the second speech recognition result information should be outputted, on the basis of at least one of the first likelihood and the second likelihood.

* * * * *